US012621080B2

(12) United States Patent
Gu et al.

(10) Patent No.: US 12,621,080 B2
(45) Date of Patent: May 5, 2026

(54) ENCODING METHOD AND ENCODING APPARATUS BASED ON SYSTEMATIC POLAR CODE

(71) Applicant: HUAWEI TECHNOLOGIES CO., LTD., Shenzhen (CN)

(72) Inventors: Jiaqi Gu, Shenzhen (CN); Jiahui Li, Shenzhen (CN); Mengyao Ma, Shenzhen (CN); Zihan Tang, Shenzhen (CN); Wei Lin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/806,876

(22) Filed: Aug. 16, 2024

(65) Prior Publication Data

US 2024/0405916 A1     Dec. 5, 2024

Related U.S. Application Data

(63) Continuation of application No. PCT/CN2023/072379, filed on Jan. 16, 2023.

(30) Foreign Application Priority Data

Feb. 17, 2022     (CN) .......................... 202210147920.0

(51) Int. Cl.
*H04L 1/00*          (2006.01)
(52) U.S. Cl.
CPC .......... *H04L 1/0057* (2013.01); *H04L 1/0076* (2013.01)

(58) Field of Classification Search
CPC ... H04L 1/0057; H04L 1/0046; H04L 1/0047; H04L 1/0076
See application file for complete search history.

(56) References Cited

U.S. PATENT DOCUMENTS

| | | | | |
|---|---|---|---|---|
| 9,479,291 B2 * | 10/2016 | Mahdavifar | .......... | H04L 1/0041 |
| 9,530,230 B2 * | 12/2016 | Conlon | .................. | G06T 11/40 |
| 10,454,499 B2 * | 10/2019 | Richardson | ......... | H03M 13/616 |
| 10,897,329 B2 * | 1/2021 | Ahn | ...................... | H04L 1/1812 |

(Continued)

OTHER PUBLICATIONS

Jin Liqiang et al: "Joint Source-Channel Polarization With Side Information", IEEE Access, vol. 6, Jan. 4, 2018 (Jan. 4, 2018), XP093266668, total 10 pages.

(Continued)

*Primary Examiner* — Esaw T Abraham

(57) ABSTRACT

The method includes: obtaining an input information bit sequence; determining a target matrix based on a first polar code generation matrix and a transformation matrix; encoding the input information bit sequence based on an inverse matrix of a first matrix, to obtain a first bit sequence, where the input information bit sequence is a bit sequence corresponding to an information bit, and the first matrix is a submatrix formed by a row, in the target matrix, corresponding to the information bit and a column, in the target matrix, corresponding to the information bit; and encoding the first bit sequence based on a second matrix, to obtain a second bit sequence, where the second matrix is a submatrix formed by the row, in the target matrix, corresponding to the information bit and a column, in the target matrix, corresponding to a frozen bit.

20 Claims, 10 Drawing Sheets

100

101

102

(56) References Cited

U.S. PATENT DOCUMENTS

| 11,095,397 B2 * | 8/2021 | Jang | H04L 1/0041 |
| 11,496,156 B2 * | 11/2022 | Chen | H03M 13/6362 |

OTHER PUBLICATIONS

Erdal Arikan: Channel Polarization: A Method for Constructing Capacity-Achieving Codes for Symmetric Binary-Input Memory-less Channels, IEEE Transactions on Information Theory, vol. 55, No. 7, Jul. 1, 2009 (Jul. 1, 2009), XP055471829, total 23 pages.
E. Ar kan, Systematic polar coding, IEEE Communications Letters, vol. 15, Issue: 8, Aug. 2011, pp. 860-862.

* cited by examiner

100

101

102

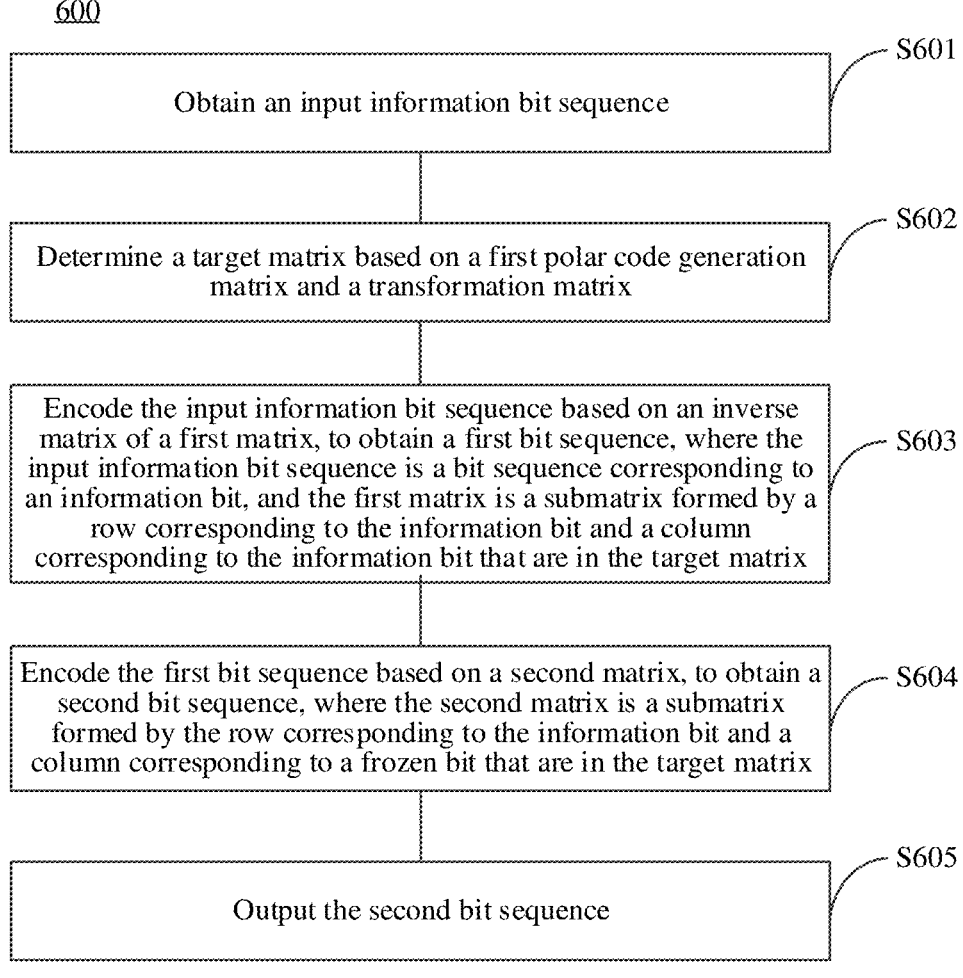

<u>600</u>

S601 — Obtain an input information bit sequence

S602 — Determine a target matrix based on a first polar code generation matrix and a transformation matrix S603 — Encode the input information bit sequence based on an inverse matrix of a first matrix, to obtain a first bit sequence, where the input information bit sequence is a bit sequence corresponding to an information bit, and the first matrix is a submatrix formed by a row corresponding to the information bit and a column corresponding to the information bit that are in the target matrix S604 — Encode the first bit sequence based on a second matrix, to obtain a second bit sequence, where the second matrix is a submatrix formed by the row corresponding to the information bit and a column corresponding to a frozen bit that are in the target matrix S605 — Output the second bit sequence

FIG. 6

ENCODING METHOD AND ENCODING APPARATUS BASED ON SYSTEMATIC POLAR CODE

CROSS-REFERENCE TO RELATED APPLICATIONS

This application is a continuation of International Application No. PCT/CN2023/072379, filed on Jan. 16, 2023, which claims priority to Chinese Patent Application No. 202210147920.0, filed on Feb. 17, 2022. The disclosures of the aforementioned applications are hereby incorporated by reference in their entireties.

TECHNICAL FIELD

This application relates to the field of data encoding technologies, and in particular, to an encoding method and an encoding apparatus based on a systematic polar code.

BACKGROUND

Polar codes may be classified into a systematic polar code and a non-systematic polar code. The systematic polar code has better bit error performance than the non-systematic polar code. Therefore, in a communication system, channel encoding is usually performed by using the systematic polar code, to improve reliability of data transmission and ensure communication quality.

However, when a length of an encoded bit sequence is small, if channel encoding is performed by using the systematic polar code, a code distance of obtained codewords is short, and performance of a code spectrum is poor.

Therefore, an encoding method based on a systematic polar code is urgently needed to improve performance of a code spectrum.

SUMMARY

This application provides an encoding method and an encoding apparatus based on a systematic polar code, to reduce a quantity of codewords with a minimum code distance and improve performance of a code spectrum.

According to a first aspect, an encoding method based on a systematic polar code is provided. The method includes: obtaining an input information bit sequence; determining a target matrix based on a first polar code generation matrix and a transformation matrix; encoding the input information bit sequence based on an inverse matrix of a first matrix, to obtain a first bit sequence, where the input information bit sequence is a bit sequence corresponding to an information bit, and the first matrix is a submatrix formed by a row corresponding to the information bit and a column corresponding to the information bit that are in the target matrix; and encoding the first bit sequence based on a second matrix, to obtain a second bit sequence, where the second matrix is a submatrix formed by the row corresponding to the information bit and a column corresponding to a frozen bit that are in the target matrix, where the transformation matrix may achieve an effect of performing sub-block column transformation on the first polar code generation matrix.

The first polar code generation matrix is a polar code generation matrix in the conventional technology. A dimension of the first polar code generation matrix is not limited in this application.

The sub-block column transformation may be understood as that column transformation is performed on a submatrix.

To be specific, column transformation may be performed on a submatrix of the first polar code generation matrix by using the transformation matrix, to obtain a polar code generation matrix that is based on the sub-block column transformation. A sending device may perform encoding by using the polar code generation matrix that is based on the sub-block column transformation.

The sending device may determine the target matrix based on the first polar code generation matrix and the transformation matrix. The sending device may determine the target matrix in a plurality of implementations.

In a possible implementation, the target matrix is a result of multiplying the first polar code generation matrix by the transformation matrix.

In another possible implementation, the target matrix is a result of multiplying the transformation matrix by the first polar code generation matrix.

After determining the target matrix, the sending device may form the submatrix by using the row corresponding to the information bit and the column corresponding to the information bit that are in the target matrix, to obtain the first matrix, and encode the input information bit sequence based on the inverse matrix of the first matrix, to obtain the first bit sequence.

After determining the target matrix, the sending device may form the submatrix by using the row corresponding to the information bit and the column corresponding to the frozen bit, to obtain the second matrix, and encode the first bit sequence based on the second matrix, to obtain the second bit sequence.

Optionally, the input information bit sequence may be Bernoulli distribution whose distribution probability is P. When sending the second bit sequence $x_{A^c}$ to a receiving device, the sending device may further send the distribution probability P of the Bernoulli distribution to the receiving device. The receiving device may decode the second bit sequence $x_{A^c}$ based on the received distribution probability P of the Bernoulli distribution.

In the encoding method based on a systematic polar code provided in this application, column transformation is performed on the submatrix of the first polar code generation matrix by using the transformation matrix, to obtain the target matrix, and the input bit sequence is encoded by using the submatrix of the target matrix, namely, the first matrix and the second matrix, so that a quantity of codewords with a minimum code distance can be reduced, performance of a code spectrum can be improved, and better bit error rate performance can be obtained.

With reference to the first aspect, in some implementations of the first aspect, the target matrix is P·G, where G is the first polar code generation matrix, P is the transformation matrix, the first matrix is $(P·G)_{AA}$, and the second matrix is $(P·G)_{AA^c}$, where A represents the information bit, and $A^C$ represents the frozen bit.

With reference to the first aspect, in some implementations of the first aspect, the transformation matrix P is expressed as:

$$P = \begin{bmatrix} (G_{N/2})_{premute} \cdot G_{N/2} & 0 \\ 0 & I \end{bmatrix},$$

where $G_{N/2}$ is a second polar code generation matrix, N/2 represents that the second polar code generation matrix is N/2×N/2-dimensional, N represents that the first polar code generation matrix is N×N-dimensional, $(G_{N/2})_{premute}$ is a matrix obtained through first preset column transformation of $G_{N/2}$, 0 is a zero matrix of N/2×N/2, and I is a unit matrix of N/2×N/2.

It should be understood that a dimension of the second polar code generation matrix and a dimension of the first polar code generation matrix are merely examples. This is not limited in this application.

The first preset column transformation may be random column transformation. For example, the first preset column transformation may be for exchanging the $3^{rd}$ column and the $1^{st}$ column in a submatrix in the second polar code generation matrix. This is not limited in this application.

With reference to the first aspect, in some implementations of the first aspect, the transformation matrix P is obtained by using a matrix S, P=G·S·G, G is the first polar code generation matrix, and the matrix S is expressed as:

$$S = \begin{bmatrix} G_{N/2} \cdot (G_{N/2})_{premute} & 0 \\ I - G_{N,2} \cdot (G_{N/2})_{premute} & I \end{bmatrix},$$

where $G_{N/2}$ is a second polar code generation matrix, N/2 represents that the second polar code generation matrix is N/2×N/2-dimensional, N represents that the first polar code generation matrix is N×N-dimensional, $(G_{N/2})_{permute}$ is a matrix obtained through first preset column transformation of $G_{N/2}$, 0 is a zero matrix of N/2×N/2, and I is a unit matrix of N/2×N/2.

With reference to the first aspect, in some implementations of the first aspect, the target matrix is G·S, where G is the first polar code generation matrix, S is the transformation matrix, the first matrix is $(G·S)_{AA}$, and the second matrix is $(G·S)_{AA}{}^{c}$, where A represents the information bit, and $A^{C}$ represents the frozen bit.

With reference to the first aspect, in some implementations of the first aspect, the transformation matrix S is expressed as:

$$S = \begin{bmatrix} G_{N/2} \cdot (G_{N/2})_{premute} & 0 \\ I - G_{N,2} \cdot (G_{N/2})_{premute} & I \end{bmatrix},$$

where $G_{N/2}$ is a second polar code generation matrix, N/2 represents that the second polar code generation matrix is N/2×N/2-dimensional, N represents that the first polar code generation matrix is N×N-dimensional, $(G_{N/2})_{premute}$ is a matrix obtained through first preset column transformation of $G_{N/2}$, 0 is a zero matrix of N/2×N/2, and I is a unit matrix of N/2×N/2.

With reference to the first aspect, in some implementations of the first aspect, the transformation matrix S is obtained by using a matrix P, S=G·P·G, G is the first polar code generation matrix, and the matrix P is expressed as:

$$P = \begin{bmatrix} (G_{N/2})_{premute} \cdot G_{N/2} & 0 \\ 0 & I \end{bmatrix},$$

where $G_{N/2}$ is a second polar code generation matrix, N/2 represents that the second polar code generation matrix is N/2×N/2-dimensional, N represents that the first polar code generation matrix is N×N-dimensional, $(G_{N/2})_{permute}$ is a matrix obtained through first preset column transformation of $G_{N/2}$, 0 is a zero matrix of N/2×N/2, and I is a unit matrix of N/2×N/2.

With reference to the first aspect, in some implementations of the first aspect, the transformation matrix includes a first transformation matrix and a second transformation matrix, where the first transformation matrix and the second transformation matrix may achieve an effect of performing sub-block column transformation on the first polar code generation matrix.

In the encoding method based on a systematic polar code provided in this application, column transformation may be performed on more submatrices of the first polar code generation matrix by using two transformation matrices, so that more codewords with the minimum code distance can be reduced based on the obtained target matrix, the performance of the code spectrum is further improved, and the better bit error rate performance can be obtained.

With reference to the first aspect, in some implementations of the first aspect, the target matrix is $P_2·P_1·G$, where G is the first polar code generation matrix, $P_1$ is the first transformation matrix, $P_2$ is the second transformation matrix, the first matrix is $(P_2·P_1·G)_{AA}$, and the second matrix is $(P_2·P_1·G)_{AA}{}^{C}$, where A represents the information bit, and $A^C$ represents the frozen bit.

With reference to the first aspect, in some implementations of the first aspect, the first transformation matrix $P_1$ is expressed as:

$$P_1 = \begin{bmatrix} A & 0 \\ 0 & B \end{bmatrix}, \quad \text{where}$$

$$A = \begin{bmatrix} (G_{N/4})_{permute1} \cdot G_{N/4} & 0 \\ 0 & I \end{bmatrix}, \quad B = \begin{bmatrix} (G_{N/4})_{permute2} \cdot G_{N/4} & 0 \\ 0 & I \end{bmatrix},$$

$G_{N/4}$ is a third polar code generation matrix, N/4 represents that the third polar code generation matrix is N/4×N/4-dimensional, N represents that the first systematic polar code generation matrix is N×N-dimensional, $(G_{N/4})_{premute1}$ is a matrix obtained through second preset column transformation of $G_{N/4}$, 0 is a zero matrix, I is a unit matrix of N/4×N/4, and $(G_{N/4})_{premute2}$ is a matrix obtained through third preset column transformation of $G_{N/4}$.

With reference to the first aspect, in some implementations of the first aspect, the second transformation matrix $P_2$ is expressed as:

$$P_2 = \begin{bmatrix} C & 0 \\ 0 & I \end{bmatrix}, \quad \text{where}$$

$$C = \begin{bmatrix} (G_{N/4})_{permute1} & 0 \\ G_{N/4} & G_{N/4} \end{bmatrix}_{permute3} \cdot \begin{bmatrix} (G_{N/4})_{permute1} & 0 \\ G_{N/4} & G_{N/4} \end{bmatrix}^{-1},$$

$$\begin{bmatrix} (G_{N/4})_{permute1} & 0 \\ G_{N/4} & G_{N/4} \end{bmatrix}_{permute3}$$

is a matrix obtained through fourth preset column transformation of $$\begin{bmatrix} (G_{N/4})_{permute1} & 0 \\ G_{N/4} & G_{N/4} \end{bmatrix},$$

$G_{N/4}$ is the third polar code generation matrix, N/4 represents that the third polar code generation matrix is N/4×N/4-dimensional, N represents that the first polar code generation matrix is N×N-dimensional, 0 is the zero matrix, and I is a unit matrix of N/2×N/2.

With reference to the first aspect, in some implementations of the first aspect, the first transformation matrix $P_1$ and the second transformation matrix $P_2$ are obtained by using a matrix $S_1$ and a matrix $S_2$, $P_1 \cdot P_2 = G \cdot S_1 \cdot S_2 \cdot G$, G is the first polar code generation matrix, and the matrix $S_1$ is expressed as:

$$S_1 = \begin{bmatrix} D & 0 \\ I-D & I \end{bmatrix}, \text{ where}$$

$$D = \begin{bmatrix} (G_{N/4})_{permute1} & 0 \\ G_{N/4} & G_{N/4} \end{bmatrix}^{-1} \cdot \begin{bmatrix} (G_{N/4})_{permute1} & 0 \\ G_{N/4} & G_{N/4} \end{bmatrix}_{permute3},$$

$G_{N/4}$ is the third polar code generation matrix, N/4 represents that the third polar code generation matrix is N/4×N/4-dimensional, N represents that the first polar code generation matrix is N×N-dimensional, $(G_{N/4})_{premute1}$ is the matrix obtained through the second preset column transformation of $G_{N/4}$, $$\begin{bmatrix} (G_{N/4})_{permute1} & 0 \\ G_{N/4} & G_{N/4} \end{bmatrix}_{permute3}$$

is the matrix obtained through the fourth preset column transformation of $$\begin{bmatrix} (G_{N/4})_{permute1} & 0 \\ G_{N/4} & G_{N/4} \end{bmatrix},$$

0 is the zero matrix, and I is a unit matrix; and
the matrix $S_2$ is expressed as:

$$S_2 = \begin{bmatrix} J & 0 \\ K & M \end{bmatrix}, \text{ where}$$

$$J = \begin{bmatrix} G_{N/4} \cdot (G_{N/4})_{permute1} & 0 \\ I - G_{N/4} \cdot (G_{N/4})_{permute1} & I \end{bmatrix},$$

$$K = \begin{bmatrix} G_{N/4} \cdot (G_{N/4})_{permute2} - G_{N/4} \cdot (G_{N/4})_{permute1} & 0 \\ G_{N/4} \cdot (G_{N/4})_{permute1} - G_{N/4} \cdot (G_{N/4})_{permute2} & 0 \end{bmatrix},$$

$$M = \begin{bmatrix} G_{N/4} \cdot (G_{N/4})_{permute2} & 0 \\ I - G_{N/4} \cdot (G_{N/4})_{permute2} & I \end{bmatrix},$$

and $(G_{N/4})_{permute2}$ is the matrix obtained through the third preset column transformation of $G_{N/4}$.

With reference to the first aspect, in some implementations of the first aspect, the target matrix is $G \cdot S_2 \cdot S_1$, where G is the first polar code generation matrix, $S_1$ is the first transformation matrix, $S_2$ is the second transformation matrix, the first matrix is $(G \cdot S_2 \cdot S_1)_{AA}$, and the second matrix is $(G \cdot S_2 \cdot S_1)_{AA^C}$, where A represents the information bit, and $A^C$ represents the frozen bit.

With reference to the first aspect, in some implementations of the first aspect, the first transformation matrix $S_1$ is expressed as:

$$S_1 = \begin{bmatrix} D & 0 \\ I-D & I \end{bmatrix}, \text{ where}$$

$$D = \begin{bmatrix} (G_{N/4})_{permute1} & 0 \\ G_{N/4} & G_{N/4} \end{bmatrix}^{-1} \cdot \begin{bmatrix} (G_{N/4})_{permute1} & 0 \\ G_{N/4} & G_{N/4} \end{bmatrix}_{permute3},$$

$G_{N/4}$ is a third polar code generation matrix, N/4 represents that the third polar code generation matrix is N/4×N/4-dimensional, N represents that the first polar code generation matrix is N×N-dimensional, $(G_{N/4})_{premute1}$ is a matrix obtained through second preset column transformation of $G_{N/4}$, $$\begin{bmatrix} (G_{N/4})_{permute1} & 0 \\ G_{N/4} & G_{N/4} \end{bmatrix}_{permute3}$$

is a matrix obtained through fourth preset column transformation of $$\begin{bmatrix} (G_{N/4})_{permute1} & 0 \\ G_{N/4} & G_{N/4} \end{bmatrix},$$

0 is a zero matrix, and I is a unit matrix of N/2×N/2.

With reference to the first aspect, in some implementations of the first aspect, the second transformation matrix $S_2$ is expressed as:

$$S_2 = \begin{bmatrix} J & 0 \\ K & M \end{bmatrix}, \text{ where}$$

$$J = \begin{bmatrix} G_{N/4} \cdot (G_{N/4})_{permute1} & 0 \\ I - G_{N/4} \cdot (G_{N/4})_{permute1} & I \end{bmatrix},$$

$$K = \begin{bmatrix} G_{N/4} \cdot (G_{N/4})_{permute2} - G_{N/4} \cdot (G_{N/4})_{permute1} & 0 \\ G_{N/4} \cdot (G_{N/4})_{permute1} - G_{N/4} \cdot (G_{N/4})_{permute2} & 0 \end{bmatrix},$$

$$M = \begin{bmatrix} G_{N/4} \cdot (G_{N/4})_{permute2} & 0 \\ I - G_{N/4} \cdot (G_{N/4})_{permute2} & I \end{bmatrix},$$

$G_{N/4}$ is the third polar code generation matrix, N/4 represents that the third systematic polar code generation matrix is N/4×N/4-dimensional, N represents that the first polar code generation matrix is N×N-dimensional, $(G_{N/4})_{permute1}$ is the matrix obtained through the second preset column transformation of $G_{N/4}$, $(G_{N/4})_{permute2}$ is a matrix obtained through third preset column transformation of $G_{N/4}$, 0 is the zero matrix, and I is a unit matrix of N/4×N/4.

With reference to the first aspect, in some implementations of the first aspect, the first transformation matrix $S_1$ and the second transformation matrix $S_2$ are obtained by using a matrix $P_1$ and a matrix $P_2$, $S_1 \cdot S_2 = G \cdot P \cdot P_2 \cdot G$, G is the first polar code generation matrix, and the matrix $P_1$ is expressed as:

$$P_1 = \begin{bmatrix} A & 0 \\ 0 & B \end{bmatrix},$$

where $$A = \begin{bmatrix} (G_{N/4})_{permute1} \cdot G_{N/4} & 0 \\ 0 & I \end{bmatrix}, \quad B = \begin{bmatrix} (G_{N/4})_{permute2} \cdot G_{N/4} & 0 \\ 0 & I \end{bmatrix},$$

$G_{N/4}$ is the third polar code generation matrix, N/4 represents that the third polar code generation matrix is N/4×N/4-dimensional, N represents that the first polar code generation matrix is N×N-dimensional, $(G_{N/4})_{permute1}$ is the matrix obtained through the second preset column transformation of $G_{N/4}$, $(G_{N/4})_{permute2}$ is the matrix obtained through the third preset column transformation of $G_{N/4}$, 0 is the zero matrix, and I is a unit matrix; and the matrix $P_2$ is expressed as:

$$P_2 = \begin{bmatrix} C & 0 \\ 0 & I \end{bmatrix}, \text{ where}$$

$$C = \begin{bmatrix} (G_{N/4})_{permute1} & 0 \\ G_{N/4} & G_{N/4} \end{bmatrix}_{permute3} \cdot \begin{bmatrix} (G_{N/4})_{permute1} & 0 \\ G_{N/4} & G_{N/4} \end{bmatrix}^{-1},$$

and $$\begin{bmatrix} (G_{N/4})_{permute1} & 0 \\ G_{N/4} & G_{N/4} \end{bmatrix}_{permute3}$$

is the matrix obtained through the fourth preset column transformation of $$\begin{bmatrix} (G_{N/4})_{permute1} & 0 \\ G_{N/4} & G_{N/4} \end{bmatrix}.$$

With reference to the first aspect, in some implementations of the first aspect, the target matrix is T·G, where G is the first polar code generation matrix, T is the transformation matrix and is an upper triangular matrix, the first matrix is $(T·G)_{AA}$, and the second matrix is $(T·G)_{AA^C}$, where A represents the information bit, and $A^C$ represents the frozen bit.

According to a second aspect, a decoding method based on a systematic polar code is provided. The method includes: obtaining a to-be-decoded bit sequence; determining a length of the to-be-decoded bit sequence; and decoding the to-be-decoded bit sequence based on inverse matrices of a first matrix and a second matrix, to obtain a bit sequence that is not encoded, where the first matrix is a submatrix formed by a row corresponding to an information bit and a column corresponding to the information bit that are in a target matrix, the second matrix is a submatrix formed by the row corresponding to the information bit and a column corresponding to a frozen bit that are in the target matrix, and the target matrix is determined based on a first polar code generation matrix and a transformation matrix.

The length of the to-be-decoded bit sequence is determined based on a distribution probability of the bit sequence that is not encoded, and the distribution probability of the bit sequence that is not encoded may be received by a receiving device from a sending device.

According to a third aspect, an encoding and decoding apparatus based on a systematic polar code is provided. The method includes an obtaining unit, a processing unit, and an encoding unit. The obtaining unit is configured to obtain an input information bit sequence. The processing unit is configured to determine a target matrix based on a first polar code generation matrix and a transformation matrix, where the transformation matrix may achieve an effect of performing sub-block column transformation on the first polar code generation matrix. The encoding unit is configured to: encode the input information bit sequence based on an inverse matrix of a first matrix, to obtain a first bit sequence, where the input information bit sequence is a bit sequence corresponding to an information bit, and the first matrix is a submatrix formed by a row corresponding to the information bit and a column corresponding to the information bit that are in the target matrix; and encode the first bit sequence based on a second matrix, to obtain a second bit sequence, where the second matrix is a submatrix formed by the row corresponding to the information bit and a column corresponding to a frozen bit that are in the target matrix.

With reference to the third aspect, in some implementations of the third aspect, the target matrix is P·G, where G is the first polar code generation matrix, P is the transformation matrix, the first matrix is $(P·G)_{AA}$, and the second matrix is $(P·G)_{AA^C}$, where A represents the information bit, and $A^C$ represents the frozen bit.

With reference to the third aspect, in some implementations of the third aspect, the transformation matrix P is expressed as:

$$P = \begin{bmatrix} (G_{N/2})_{premute} \cdot G_{N/2} & 0 \\ 0 & I \end{bmatrix},$$

where $G_{N/2}$ is a second polar code generation matrix, N/2 represents that the second polar code generation matrix is N/2×N/2-dimensional, N represents that the first polar code generation matrix is N×N-dimensional, $(G_{N/2})_{premute}$ is a matrix obtained through first preset column transformation of $G_{N/2}$, 0 is a zero matrix of N/2×N/2, and I is a unit matrix of N/2×N/2.

With reference to the third aspect, in some implementations of the third aspect, the transformation matrix P is obtained by using a matrix S, P=G·S·G, G is the first polar code generation matrix, and the matrix S is expressed as:

$$S = \begin{bmatrix} G_{N/2} \cdot (G_{N/2})_{premute} & 0 \\ I - G_{N/2} \cdot (G_{N/2})_{premute} & I \end{bmatrix},$$

where $G_{N/2}$ is the second polar code generation matrix, N/2 represents that the second polar code generation matrix is N/2×N/2-dimensional, N represents that the first polar code generation matrix is N×N-dimensional, $(G_{N/2})_{permute}$ is the matrix obtained through the first preset column transformation of $G_{N/2}$, 0 is the zero matrix of N/2×N/2, and I is the unit matrix of N/2×N/2.

With reference to the third aspect, in some implementations of the third aspect, the target matrix is G·S, where G is the first polar code generation matrix, S is the transformation matrix, the first matrix is $(G·S)_{AA}$, and the second matrix is $(G·S)_{AA^C}$, where A represents the information bit, and $A^C$ represents the frozen bit.

With reference to the third aspect, in some implementations of the third aspect, the transformation matrix S is expressed as:

$$S = \begin{bmatrix} G_{N/2} \cdot (G_{N/2})_{premute} & 0 \\ I - G_{N/2} \cdot (G_{N/2})_{permute} & I \end{bmatrix},$$

where $G_{N/2}$ is a second polar code generation matrix, N/2 represents that the second polar code generation matrix is N/2×N/2-dimensional, N represents that the first polar code generation matrix is N×N-dimensional, $(G_{N/2})_{premute}$ is a matrix obtained through first preset column transformation of $G_{N/2}$, 0 is a zero matrix of N/2×N/2, and I is a unit matrix of N/2×N/2.

With reference to the third aspect, in some implementations of the third aspect, the transformation matrix S is obtained by using a matrix P, S=G·P·G, G is the first polar code generation matrix, and the matrix P is expressed as:

$$P = \begin{bmatrix} (G_{N/2})_{premute} \cdot G_{N/2} & 0 \\ 0 & I \end{bmatrix},$$

where $G_{N/2}$ is the second polar code generation matrix, N/2 represents that the second polar code generation matrix is N/2×N/2-dimensional, N represents that the first polar code generation matrix is N×N-dimensional, $(G_{N/2})_{permute}$ is the matrix obtained through the first preset column transformation of $G_{N/2}$, 0 is the zero matrix of N/2×N/2, and I is the unit matrix of N/2×N/2.

With reference to the third aspect, in some implementations of the third aspect, the transformation matrix includes a first transformation matrix and a second transformation matrix, where the first transformation matrix and the second transformation matrix may achieve an effect of performing sub-block column transformation on the first polar code generation matrix.

With reference to the third aspect, in some implementations of the third aspect, the target matrix is $P_2 \cdot P_1 \cdot G$, where G is the first polar code generation matrix, $P_1$ is the first transformation matrix, $P_2$ is the second transformation matrix, the first matrix is $(P_2 \cdot P_1 \cdot G)_{AA}$, and the second matrix is $(P_2 \cdot P_1 \cdot G)_{AA^C}$, where A represents the information bit, and $A^C$ represents the frozen bit.

With reference to the third aspect, in some implementations of the third aspect, the first transformation matrix $P_1$ is expressed as:

$$P_1 = \begin{bmatrix} A & 0 \\ 0 & B \end{bmatrix}, \text{ where}$$

$$A = \begin{bmatrix} (G_{N/4})_{permute1} \cdot G_{N/4} & 0 \\ 0 & I \end{bmatrix}, B = \begin{bmatrix} (G_{N/4})_{permute2} \cdot G_{N/4} & 0 \\ 0 & I \end{bmatrix},$$

$G_{N/4}$ is a third polar code generation matrix, N/4 represents that the third polar code generation matrix is N/4×N/4-dimensional, N represents that the first systematic polar code generation matrix is N×N-dimensional, $(G_{N/4})_{premute1}$ is a matrix obtained through second preset column transformation of $G_{N/4}$, 0 is a zero matrix, I is a unit matrix of N/4×N/4, and $(G_{N/4})_{premute2}$ is a matrix obtained through third preset column transformation of $G_{N/4}$.

With reference to the third aspect, in some implementations of the third aspect, the second transformation matrix $P_2$ is expressed as:

$$P_2 = \begin{bmatrix} C & 0 \\ 0 & I \end{bmatrix}, \text{ where}$$

-continued $$C = \begin{bmatrix} (G_{N/4})_{permute1} & 0 \\ G_{N/4} & G_{N/4} \end{bmatrix}_{permute3} \cdot \begin{bmatrix} (G_{N/4})_{permute1} & 0 \\ G_{N/4} & G_{N/4} \end{bmatrix}^{-1},$$

$$\begin{bmatrix} (G_{N/4})_{permute1} & 0 \\ G_{N/4} & G_{N/4} \end{bmatrix}_{permute3}$$

is a matrix obtained through fourth preset column transformation of $$\begin{bmatrix} (G_{N/4})_{permute1} & 0 \\ G_{N/4} & G_{N/4} \end{bmatrix}, G_{N/4}$$

is the third polar code generation matrix, N/4 represents that the third polar code generation matrix is N/4×N/4-dimensional, N represents that the first polar code generation matrix is N×N-dimensional, 0 is the zero matrix, and I is a unit matrix of N/2×N/2.

With reference to the third aspect, in some implementations of the third aspect, the first transformation matrix $P_1$ and the second transformation matrix $P_2$ are obtained by using a matrix $S_1$ and a matrix $S_2$, $P_1 \cdot P_2 = G \cdot S_1 \cdot S_2 \cdot G$, G is the first polar code generation matrix, and the matrix $S_1$ is expressed as:

$$S_1 = \begin{bmatrix} D & 0 \\ I-D & I \end{bmatrix}, \text{ where}$$

$$D = \begin{bmatrix} (G_{N/4})_{permute1} & 0 \\ G_{N/4} & G_{N/4} \end{bmatrix}^{-1} \cdot \begin{bmatrix} (G_{N/4})_{permute1} & 0 \\ G_{N/4} & G_{N/4} \end{bmatrix}_{permute3},$$

$G_{N/4}$ is the third polar code generation matrix, N/4 represents that the third polar code generation matrix is N/4×N/4-dimensional, N represents that the first polar code generation matrix is N×N-dimensional, $(G_{N/4})_{premute1}$ is the matrix obtained through the second preset column transformation of $G_{N/4}$, $$\begin{bmatrix} (G_{N/4})_{permute1} & 0 \\ G_{N/4} & G_{N/4} \end{bmatrix}_{permute3}$$

is the matrix obtained through the fourth preset column transformation of $$\begin{bmatrix} (G_{N/4})_{permute1} & 0 \\ G_{N/4} & G_{N/4} \end{bmatrix},$$

0 is the zero matrix, and I is a unit matrix; and the matrix $S_2$ is expressed as:

$$S_2 = \begin{bmatrix} J & 0 \\ K & M \end{bmatrix}, \text{ where}$$

$$J = \begin{bmatrix} G_{N/4} \cdot (G_{N/4})_{permute1} & 0 \\ I - G_{N/4} \cdot (G_{N/4})_{permute1} & I \end{bmatrix},$$

-continued $$K = \begin{bmatrix} G_{N/4} \cdot (G_{N/4})_{permute2} - G_{N/4} \cdot (G_{N/4})_{permute1} & 0 \\ G_{N/4} \cdot (G_{N/4})_{permute1} - G_{N/4} \cdot (G_{N/4})_{permute2} & 0 \end{bmatrix},$$

$$M = \begin{bmatrix} G_{N/4} \cdot (G_{N/4})_{permute2} & 0 \\ I - G_{N/4} \cdot (G_{N/4})_{permute2} & I \end{bmatrix}$$

and $(G_{N/4})_{permute2}$ is the matrix obtained through the third preset column transformation of $G_{N/4}$.

With reference to the third aspect, in some implementations of the third aspect, the target matrix is $G \cdot S_2 \cdot S_1$, where G is the first polar code generation matrix, $S_1$ is the first transformation matrix, $S_2$ is the second transformation matrix, the first matrix is $(G \cdot S_2 \cdot S_1)_{AA}$, and the second matrix is $(G \cdot S_2 \cdot S_1)_{AA^C}$, where A represents the information bit, and $A^C$ represents the frozen bit.

With reference to the third aspect, in some implementations of the third aspect, the first transformation matrix $S_1$ is expressed as:

$$S = \begin{bmatrix} D & 0 \\ I - D & I \end{bmatrix}, \text{ where}$$

$$D = \begin{bmatrix} (G_{N/4})_{permute1} & 0 \\ G_{N/4} & G_{N/4} \end{bmatrix}^{-1} \cdot \begin{bmatrix} (G_{N/4})_{permute1} & 0 \\ G_{N/4} & G_{N/4} \end{bmatrix}_{permute3},$$

$G_{N/4}$ is a third polar code generation matrix, N/4 represents that the third polar code generation matrix is N/4×N/4-dimensional, N represents that the first polar code generation matrix is N×N-dimensional, $(G_{N/4})_{premute1}$ is a matrix obtained through second preset column transformation of $G_{N/4}$, $$\begin{bmatrix} (G_{N/4})_{permute1} & 0 \\ G_{N/4} & G_{N/4} \end{bmatrix}_{permute3}$$

is a matrix obtained through fourth preset column transformation of $$\begin{bmatrix} (G_{N/4})_{permute1} & 0 \\ G_{N/4} & G_{N/4} \end{bmatrix},$$

is a zero matrix, and I is a unit matrix of N/2×N/2.

With reference to the third aspect, in some implementations of the third aspect, the second transformation matrix $S_2$ is expressed as:

$$S_2 = \begin{bmatrix} J & 0 \\ K & M \end{bmatrix}, \text{ where}$$

$$J = \begin{bmatrix} G_{N/4} \cdot (G_{N/4})_{permute1} & 0 \\ I - G_{N/4} \cdot (G_{N/4})_{permute1} & I \end{bmatrix},$$

$$K = \begin{bmatrix} G_{N/4} \cdot (G_{N/4})_{permute2} - G_{N/4} \cdot (G_{N/4})_{permute1} & 0 \\ G_{N/4} \cdot (G_{N/4})_{permute1} - G_{N/4} \cdot (G_{N/4})_{permute2} & 0 \end{bmatrix},$$

$$M = \begin{bmatrix} G_{N/4} \cdot (G_{N/4})_{permute2} & 0 \\ I - G_{N/4} \cdot (G_{N/4})_{permute2} & I \end{bmatrix},$$

$G_{N/4}$ is the third polar code generation matrix, N/4 represents that the third systematic polar code generation matrix is N/4×N/4-dimensional, N represents that the first polar code generation matrix is N×N-dimensional, $(G_{N/4})_{permute1}$ is the matrix obtained through the second preset column transformation of $G_{N/4}$, $(G_{N/4})_{permute2}$ is a matrix obtained through third preset column transformation of $G_{N/4}$, 0 is the zero matrix, and I is a unit matrix of N/4×N/4.

With reference to the third aspect, in some implementations of the third aspect, the first transformation matrix $S_1$ and the second transformation matrix $S_2$ are obtained by using a matrix $P_1$ and a matrix $P_2$, $S_1 \cdot S_2 = G \cdot P_1 \cdot P_2 \cdot G$, G is the first polar code generation matrix, and the matrix $P_1$ is expressed as:

$$P_1 = \begin{bmatrix} A & 0 \\ 0 & B \end{bmatrix}, \text{ where}$$

$$A = \begin{bmatrix} (G_{N/4})_{permute1} \cdot G_{N/4} & 0 \\ 0 & I \end{bmatrix}, B = \begin{bmatrix} (G_{N/4})_{permute2} \cdot G_{N/4} & 0 \\ 0 & I \end{bmatrix},$$

$G_{N/4}$ is the third polar code generation matrix, N/4 represents that the third polar code generation matrix is N/4×N/4-dimensional, N represents that the first polar code generation matrix is N×N-dimensional, $(G_{N/4})_{permute1}$ is the matrix obtained through the second preset column transformation of $G_{N/4}$, $(G_{N/4})_{permute2}$ is the matrix obtained through the third preset column transformation of $G_{N/4}$, 0 is the zero matrix, and I is a unit matrix; and the matrix $P_2$ is expressed as:

$$P_2 = \begin{bmatrix} C & 0 \\ 0 & I \end{bmatrix}, \text{ where}$$

$$C = \begin{bmatrix} (G_{N/4})_{permute1} & 0 \\ G_{N/4} & G_{N/4} \end{bmatrix}_{permute3} \cdot \begin{bmatrix} (G_{N/4})_{permute1} & 0 \\ G_{N/4} & G_{N/4} \end{bmatrix}^{-1}, \text{ and}$$

$$\begin{bmatrix} (G_{N/4})_{permute1} & 0 \\ G_{N/4} & G_{N/4} \end{bmatrix}_{permute3}$$

is the matrix obtained through the fourth preset column transformation of $$\begin{bmatrix} (G_{N/4})_{permute1} & 0 \\ G_{N/4} & G_{N/4} \end{bmatrix}.$$

With reference to the third aspect, in some implementations of the third aspect, the target matrix is T·G, where G is the first polar code generation matrix, T is the transformation matrix and is an upper triangular matrix, the first matrix is $(T \cdot G)_{AA}$, and the second matrix is $(T \cdot G)_{AA^C}$, where A represents the information bit, and $A^C$ represents the frozen bit.

According to a fourth aspect, an encoding and decoding apparatus based on a systematic polar code is provided. The apparatus includes an obtaining unit, a processing unit, and a decoding unit. The obtaining unit is configured to obtain a to-be-decoded bit sequence. The processing unit is configured to determine a length of the to-be-decoded bit sequence. The decoding unit is configured to decode the to-be-decoded bit sequence based on inverse matrices of a first matrix and a second matrix, to obtain a bit sequence that is not encoded, where the first matrix is a submatrix formed by a row corresponding to an information bit and a column corresponding to an information bit that are in a target matrix, the second matrix is a submatrix formed by the row corresponding to the information bit and a column corresponding to a frozen bit that are in the target matrix, and the target matrix is determined based on a first polar code generation matrix and a transformation matrix.

According to a fifth aspect, an encoding and decoding apparatus based on a systematic polar code is provided. The apparatus includes a processor and a memory. The memory is configured to store a computer program, and the processor is configured to invoke the computer program from the memory and run the computer program, so that the apparatus performs the method in any one of the possible implementations of the first aspect or the method in the second aspect.

Optionally, there are one or more processors, and there are one or more memories.

Optionally, the memory may be integrated with the processor, or the memory and the processor are separately disposed.

Optionally, the encoding apparatus further includes a transmitter and a receiver. The transmitter and the receiver may be separately disposed, or may be integrated together, and are referred to as a transceiver.

According to a sixth aspect, this application provides a processor, including an input circuit, an output circuit, and a processing circuit. The processing circuit is configured to: receive a signal by using the input circuit, and transmit the signal by using the output circuit, so that the processor performs the method in any one of the possible implementations of the first aspect or the method in the second aspect.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit serves as the input circuit and the output circuit at different moments. Specific implementations of the processor and various circuits are not limited in this application.

According to a seventh aspect, a computer-readable storage medium is provided. The computer-readable storage medium stores a computer program (which may also be referred to as code or instructions). When the computer program is run on a computer, the computer performs the method in any one of the possible implementations of the first aspect or the method in the second aspect.

According to an eighth aspect, a computer program product is provided. The computer program product includes a computer program (which may also be referred to as code or instructions). When the computer program is run, a computer is enabled to perform the method in any one of the possible implementations of the first aspect or the method in the second aspect.

BRIEF DESCRIPTION OF DRAWINGS

FIG. 6 is a schematic flowchart of an example encoding method based on a systematic polar code according to an embodiment of this application;

DESCRIPTION OF EMBODIMENTS

Figure 1:
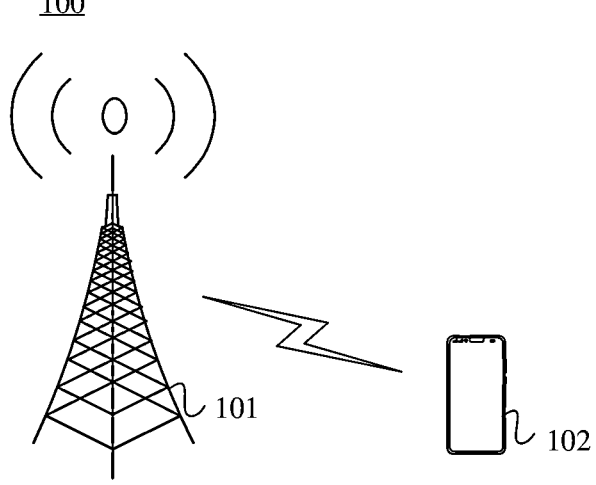
FIG. 1 is a diagram of an example communication system to which an embodiment of this application is applicable.

The following describes technical solutions of this application with reference to the accompanying drawings.

The technical solutions in embodiments of this application may be applied to various communication systems, for example, a wireless local area network (WLAN) communication system, a long term evolution (LTE) system, an LTE frequency division duplex (FDD) system, an LTE time division duplex (TDD) system, a 5th generation (5G) mobile communication system, a new radio (NR) system, a worldwide interoperability for microwave access (WiMAX) communication system, or another evolved communication system. The 5G system usually includes the following three major application scenarios: enhanced mobile broadband (eMBB), ultra-reliable and low-latency communication (URLLC), and massive machine-type communication (mMTC).

A terminal device in embodiments of this application may also be referred to as user equipment (UE), a mobile station (MS), a mobile terminal (MT), an access terminal, a subscriber unit, a subscriber station, a mobile station, a remote station, a remote terminal, a mobile device, a user terminal, a terminal, a wireless communication device, a user agent, a user apparatus, or the like.

The terminal device may be a device that provides voice/data connectivity for a user, for example, a handheld device or a vehicle-mounted device that has a wireless connection function. Currently, examples of some terminals are as follows: a mobile phone, a tablet computer, a notebook computer, a handheld computer, a mobile internet device (MID), a wearable device, a virtual reality (VR) device, an augmented reality (AR) device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a 5G network, a terminal device in a future evolved public land mobile network (PLMN), and the like. This is not limited in embodiments of this application.

In addition, in embodiments of this application, the terminal device may alternatively be a terminal device in an internet of things (IoT) system. An IoT is an important part of future development of information technologies. A main technical feature of the IoT is connecting a thing to a network by using a communication technology, to implement an intelligent network for interconnection between a person and a machine or between things.

In addition, a network device in embodiments of this application may be a device used to communicate with a terminal device. The network device may also be referred to as an access network device or a wireless access network device, and may be a transmission reception point (TRP), an evolved NodeB (eNB or eNodeB) in an LTE system, a home NodeB (for example, a home evolved NodeB or a home NodeB, HNB), a baseband unit (BBU), or a wireless controller in a cloud radio access network (CRAN) scenario. Alternatively, the network device may be a relay station, an access point, a vehicle-mounted device, a wearable device, a network device in a 5G network, a network device in a future evolved PLMN network, or the like; or may be an access point (AP) in a WLAN, a gNB in a new radio (NR) system, a satellite base station in a satellite communication system, or the like. This is not limited in embodiments of this application.

In a network structure, the network device may include a central unit (CU) node or a distributed unit (DU) node, a RAN device including a CU node and a DU node, or a RAN device including a control plane CU node (CU-CP node), a user plane CU node (CU-UP node), and a DU node.

The network device provides a service for a cell, and a terminal device communicates with the cell by using a transmission resource allocated by the network device (for example, a frequency domain resource or a spectrum resource). The cell may belong to a macro base station (for example, a macro eNB or a macro gNB), or may belong to a base station corresponding to a small cell. The small cell herein may include: a metro cell, a micro cell, a pico cell, a femto cell, or the like. These small cells have characteristics of small coverage and low transmit power, and are applicable to providing a high-speed data transmission service.

In embodiments of this application, the terminal device or the network device includes a hardware layer, an operating system layer running on the hardware layer, and an application layer running on the operating system layer. The hardware layer includes hardware such as a central processing unit (CPU), a memory management unit (MMU), and a memory (which is also referred to as a main memory). The operating system may be any one or more types of computer operating systems that implement service processing through a process, for example, a Linux operating system, a Unix operating system, an Android operating system, an iOS operating system, or a windows operating system. The application layer includes applications such as a browser, an address book, word processing software, and instant messaging software. In addition, a specific structure of an execution body of a method provided in embodiments of this application is not particularly limited in embodiments of this application, provided that a program that records code of the method provided in embodiments of this application can be run to perform communication based on the method provided in embodiments of this application. For example, the execution body of the method provided in embodiments of this application may be the terminal device or the network device, or a functional module that can invoke and execute the program in the terminal device or the network device.

In addition, aspects or features of this application may be implemented as a method, an apparatus, or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk or a magnetic tape), an optical disc (for example, a compact disc (CD), or a digital versatile disc (DVD)), a smart card and a flash memory component (for example, erasable programmable read-only memory (EPROM), a card, a stick, or a key drive). In addition, various storage media described in this specification may represent one or more devices and/or other machine-readable media that are configured to store information. The term "machine-readable media" may include but are not limited to a radio channel, and various other media that can store, contain and/or carry instructions and/or data.

For ease of understanding of embodiments of this application, an example communication system 100 to which embodiments of this application are applicable is first described in detail with reference to FIG. 1.

The communication system 100 includes a network device 101 and a terminal device 102. The network device 101 may serve as a sending device, to send control information and/or a transport block to the terminal device 102. Alternatively, the terminal device 102 may serve as a sending device, to send control information and/or a transport block to the network device 101. In this scenario, there may be one or more terminal devices. This is not limited in this embodiment of this application.

Embodiments of this application may be applied to a plurality of different scenarios, including the scenario shown in FIG. 1, but are not limited to the scenario. For example, for uplink transmission, the terminal device may serve as a sending device, and the network device may serve as a receiving device. For downlink transmission, the network device may serve as a sending device, and the terminal device may serve as a receiving device. For another scenario, for example, in transmission between network devices, one network device may serve as a sending device, and another network device may serve as a receiving device. For another example, in transmission between terminal devices, one terminal device may serve as a sending device, and another terminal device may serve as a receiving device. Therefore, the following describes embodiments of this application based on a sending device and a receiving device.

Figure 2:
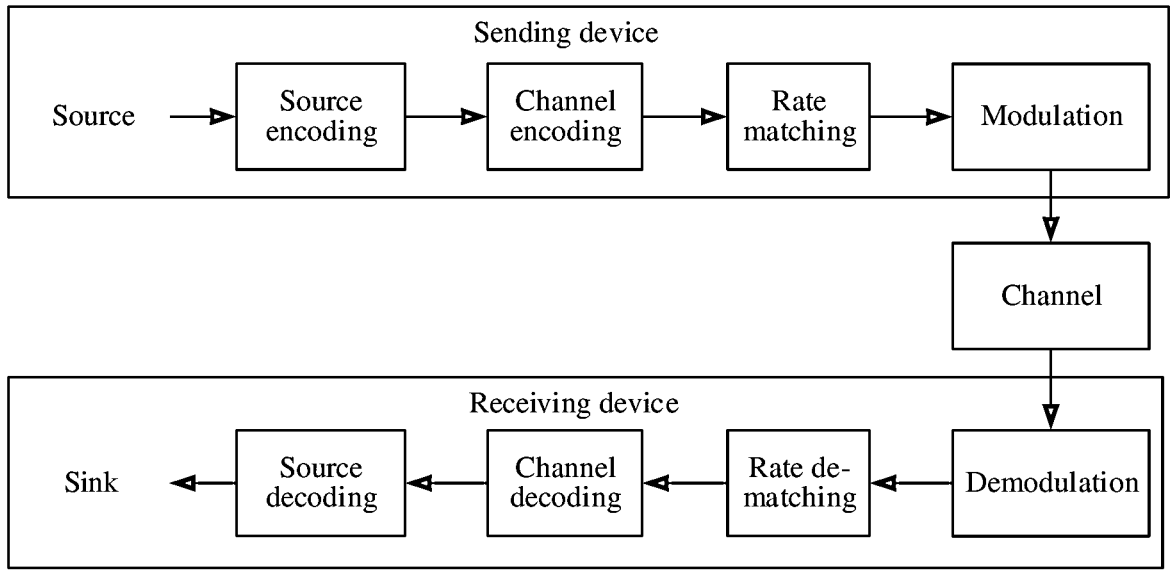
FIG. 2 is a schematic block diagram of an example communication method.

Communication between the sending device and the receiving device may be shown in FIG. 2. After performing source encoding, channel encoding, rate matching, and modulation on a source, the sending device transmits information to the receiving device through a channel. Correspondingly, after receiving the information, the receiving device performs demodulation, rate de-matching, channel decoding, and source decoding on the information, to obtain a sink.

A specific implementation of the channel encoding may be a polar code encoding manner, and polar codes may be further classified into a systematic polar code and a non-systematic polar code. The systematic polar code has better bit error performance than the non-systematic polar code. Therefore, in a communication system, a channel is usually encoded by using the systematic polar code, to improve reliability of data transmission and ensure communication quality.

There are a plurality of possible implementations in which the sending device performs source encoding and channel encoding. In a possible implementation, the sending device separately encodes a source and a channel. In another possible implementation, the sending device jointly encodes a source and a channel. In both the two implementations, encoding may be performed by using the systematic polar code. However, a code distance of codewords obtained by performing encoding by using the systematic polar code is short, and consequently, performance of a code spectrum is poor.

In view of this, embodiments of this application provide an encoding method and an encoding apparatus based on a systematic polar code, to reduce a quantity of codewords with a minimum code distance and improve performance of a code spectrum.

For ease of understanding of embodiments of this application, the following first describes an encoding manner in embodiments of this application.

1. Polar Code

The polar code is an existing known channel encoding scheme that can be strictly proved to "reach" a channel capacity, and has features such as high performance and low complexity. Currently, the polar code has been determined by the 3rd generation partnership project (3GPP) as a control channel encoding scheme in a 5th generation mobile communication technology (5th generation mobile communication technology, 5G) control channel eMBB scenario (up-link/downlink).

2. Polar Code Encoding

A polar code is a type of linear block code, and an encoding process of the polar code may be $x_N = u_N G_N$, where $u_N = \{u_1, u_2, \ldots, u_N\}$ is a binary row vector whose length is N, $G_N = F^{\otimes n}$ is an encoding matrix, $$F = \begin{bmatrix} 1 & 0 \\ 1 & 1 \end{bmatrix},$$

$F^{\otimes n}$ represents a Kronecker power of F, and $F^{\otimes n} = F \otimes F^{\otimes (n-1)}$ may be defined.

In the encoding process of the polar code, $u_N$ may be divided into two parts. A part of bits carry information, and are referred to as information bits, and an index set of these bits may be denoted as A. The other part of bits are fixed values, are referred to as fixed bits, and are usually set to 0. When the fixed bit is set to 0, the encoding process of the polar code may be simplified as $x_A = u_A G_N(A)$, where u, is an information bit set in $u_N$, and a length of the information bit set may be denoted as K. $G_N(A)$ is a submatrix formed by rows corresponding to indexes in the set A in $G_N$, and $G_N(A)$ is a matrix of K×N. Selection of the set A affects performance of the polar code.

Figure 3:
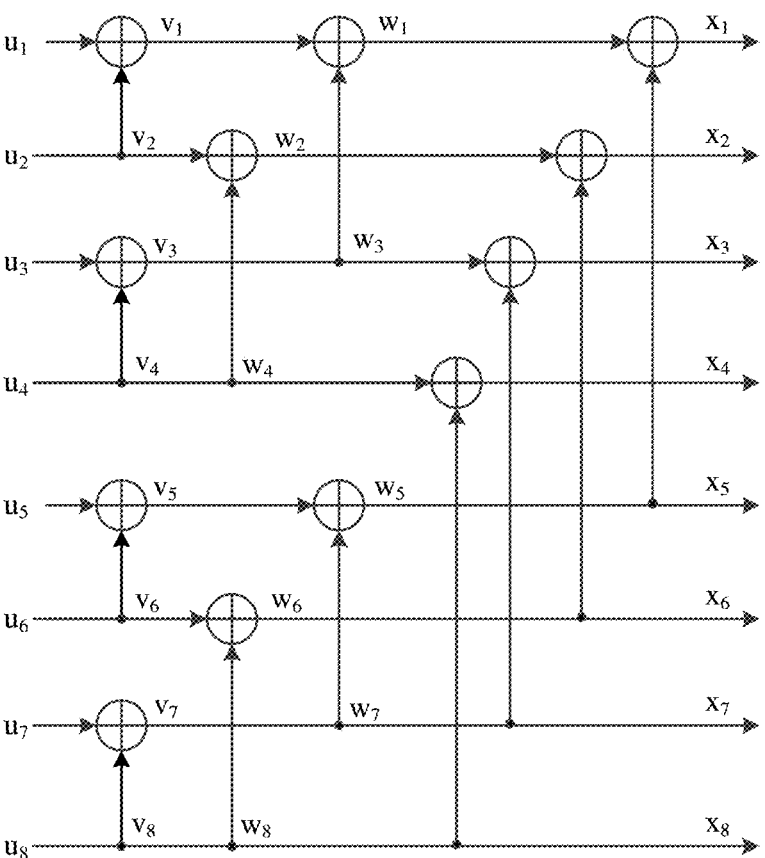
FIG. 3 is a diagram of example polar code encoding.

FIG. 3 is a diagram of example polar code encoding. As shown in FIG. 3, $u_8 = \{u_1, u_2, \ldots, u_8\}$ is a binary row vector whose length is 8. The binary row vector may include a fixed bit and an information bit, and the fixed bit and the information bit may be adjacent or interleaved. For example, $u_1$, $u_2$, $u_3$, and $u_5$ are fixed bits, and may all be 0, and $u_4$, $u_6$, $u_7$, and $u_8$ are information bits. A circled plus symbol $\oplus$ shown in the figure represents an exclusive OR operation. $u_1$, $u_2$, $u_3$, $u_4$, $u_5$, $u_6$, $u_7$, and $u_8$ form a bit sequence that is not encoded, $v_1$, $v_2$, $v_3$, $v_4$, $v_5$, $v_6$, $v_7$, $v_8$, $w_1$, $w_2$, $w_3$, $w_4$, $w_5$, $w_6$, $w_7$, and we are intermediate results in an encoding process, and $x_1$, $x_2$, $x_3$, $x_4$, $x_5$, $x_6$, $x_7$, and $x_8$ form an encoded bit sequence. The intermediate result in the encoding process is merely an example, but embodiments of this application are not limited thereto.

3. Polar Code Decoding

There are a plurality of possible implementations of the polar code decoding, for example, successive cancellation (SC) decoding, successive cancellation list (SCL) decoding, and successive cancellation stack decoding.

The SC decoding is the earliest proposed polar code decoding, and may be described as a process of searching a code tree for a correct path. For example, one code whose code length is $N = 2^n$ may correspond to one n-layer binary decoding code tree. In the SC decoding, decoding is performed bit by bit from a root node of the code tree to a bottom layer.

In a case of a limited code length, performance in which the polar code is decoded based on the SC decoding is not ideal. The SCL decoding and the successive cancellation stack decoding are improved algorithms of the SC decoding. In the SCL decoding, performance of a polar code of a limited code length can be improved by simultaneously reserving a plurality of decoding paths in a decoding process and finally outputting a decoding result with a highest probability. In addition, in the SCL decoding, cyclic redundancy check (CRC) may be further used to assist in selecting a correct decoding result, so that the performance of the polar code of the limited code length may be further improved.

4. Systematic Polar Code

A main idea of the systematic polar code is to ensure that an information bit appears in an encoded codeword, in other words, the encoded codeword includes the original information bit.

The systematic polar code is provided by the inventor Arikan, and a specific implementation of the systematic polar code is as follows:

Assuming that a source bit is u and a codeword is x, a source bit may be expressed as $u_N = (u_A, u_{A^c})$, where A represents an information bit set, and $A^C$ represents a frozen bit set. In this case, the following may be obtained:

$$x = u_A G_A + u_{A^c} G_{A^c}, \text{ where}$$

$G_A$ represents a submatrix formed by a row corresponding to an information bit in a generation matrix G, and $G_{A^c}$ represents a submatrix formed by a row corresponding to a frozen bit in the generation matrix G. If x is expressed as $(x_B, x_{B^c})$, and B is any subset of $[1, 2, \ldots, N]$, the foregoing equation may be expressed as:

$$x = (x_B, x_{B^c}) = u_A \begin{bmatrix} G_{AB} \\ G_{AB^c} \end{bmatrix} + u_{A^c} \begin{bmatrix} G_{A^c B} \\ G_{A^c B^c} \end{bmatrix} = \begin{bmatrix} u_A G_{AB} + u_{A^c} G_{A^c B} \\ u_A G_{AB^c} + u_{A^c} G_{A^c B^c} \end{bmatrix}.$$

According to the foregoing equation, the following may be obtained:

$$x_B = u_A G_{AB} + u_{A^c} G_{A^c B}; \text{ and}$$

$$x_{B^c} = u_A G_{AB^c} + u_{A^c} G_{A^c B^c}.$$

The following is obtained through further deduction:

$$u_A = (x_B - u_{A^c} G_{A^c B}) \cdot G_{AB}^{-1}; \text{ and}$$

$$x_{B^c} = (x_B - u_{A^c} G_{A^c B}) \cdot G_{AB}^{-1} G_{AB^c} + u_{A^c} G_{A^c B^c} = x_B \cdot G_{AB}^{-1} G_{AB^c}.$$

When and only when a set A and a set B have a same quantity of elements and GAB is reversible, the following may be obtained:

$$x_{B^c} = x_{A^c} = x_A \cdot G_{AA}^{-1} G_{AA^c}.$$

It can be learned that, a parity bit $x_{A^c} = x_A \cdot G_{AA}^{-1} G_{AA^c}$. If the encoded codeword includes the original information bit (namely, a to-be-encoded information bit), in other words, $x_A$ is known, a codeword x is obtained through encoding based on the systematic polar code.

Figure 4:
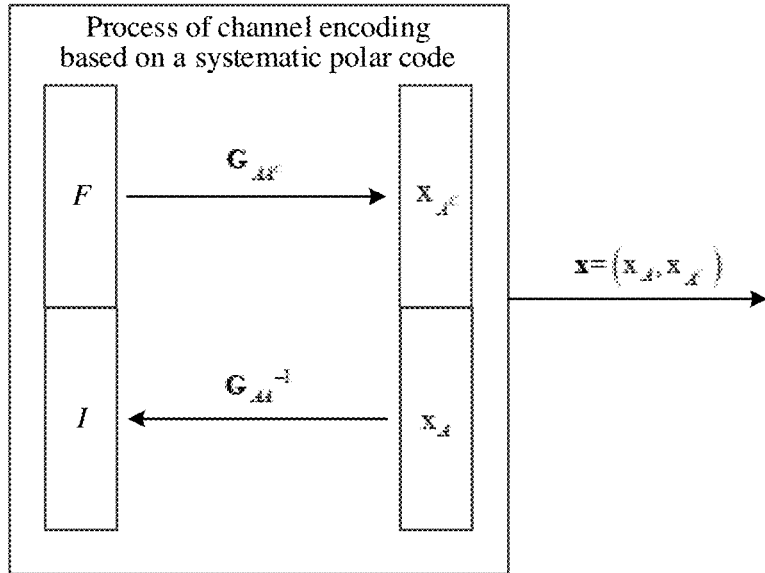
FIG. 4 is a diagram of example channel encoding based on a systematic polar code.

An example encoding process based on the systematic polar code may also be described by using a figure. FIG. 4 is a diagram of the encoding process based on the systematic polar code. As shown in FIG. 4, information bits that are not encoded include F and I, where F is a bit set corresponding to frozen bits, I is a set of information bits, and encoded codewords include $x_A$ and $x_{A^c}$, where $x_A$ is an original information bit, namely, the information bit that is not encoded, $x_{A^c}$ is a check bit, and $x_{A^c} = x_A \cdot G_{AA}^{-1} G_{AA^c}$. $x_A$ is the original information bit. Therefore, a codeword obtained through encoding is $x = (x_A, x_{A^c})$.

Figure 5:
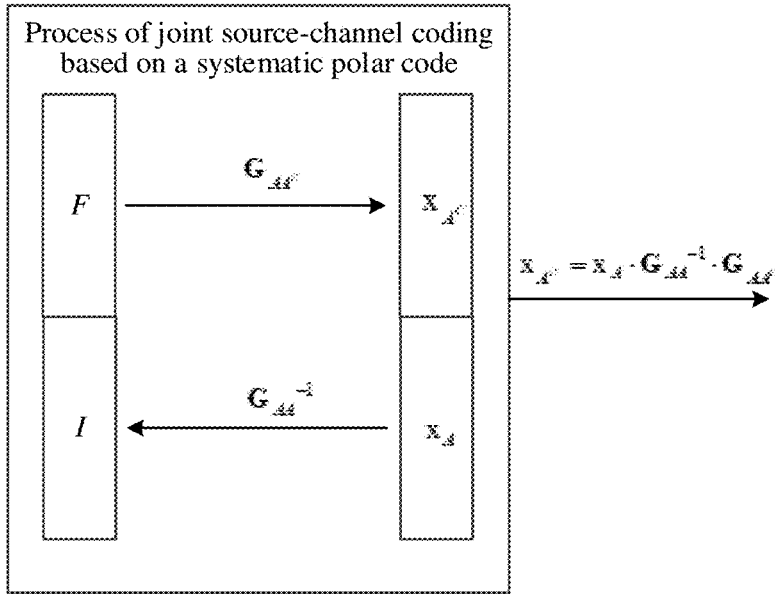
FIG. 5 is a diagram of example source and channel encoding based on a systematic polar code.

If the systematic polar code is applied to joint source-channel coding (JSCC), an example encoding process is shown in FIG. 5. When the systematic polar code is applied to joint source-channel coding, an encoding process is similar to the encoding process in FIG. 4, and an obtained encoded codeword is $x = (x_A, x_{A^c})$. However, the encoded codeword is finally compressed, in other words, only the check bit $x_{A^c} = x_A \cdot G_{AA}^{-1} G_{AA^c}$ is reserved, to obtain a final result.

To clearly describe the technical solutions in embodiments of this application, terms such as "first" and "second" are used in embodiments of this application to distinguish between same items or similar items that provide basically same functions or purposes. For example, a first matrix and a second matrix are intended to distinguish between different matrices, but are not intended to limit a sequence of the first matrix and the second matrix. A person skilled in the art may understand that the terms such as "first" and "second" do not limit a quantity or an execution sequence, and the terms such as "first" and "second" do not indicate a definite difference.

It should be noted that, in this application, terms such as "example" or "for example" are used for representing giving an example, an illustration, or a description. Any embodiment or design scheme described as an "example" or "for example" in this application should not be explained as being more preferred or having more advantages than another embodiment or design scheme. Exactly, use of the term "example", "for example", or the like is intended to present a related concept in a specific manner.

In addition, "at least one" means one or more, and "a plurality of" means two or more. "And/or" describes an association relationship between associated objects, and represents that three relationships may exist. For example, A and/or B may represent the following cases: Only A exists, both A and B exist, and only B exists, where A and B may be singular or plural. The character "/" generally indicates an "or" relationship between the associated objects. At least one of the following items (pieces) or a similar expression thereof indicates any combination of these items, including a single item (piece) or any combination of a plurality of items (pieces). For example, at least one of a, b, and c may represent a, or b, or c, or a and b, or a and c, or b and c, or a, b, and c, where a, b, and c may be single, or may be plural.

The encoding method and the encoding apparatus based on a systematic polar code provided in embodiments of this application may be applied to channel encoding and joint source-channel coding, in other words, may be applied to the encoding processes shown in FIG. 4 and FIG. 5.

The following uses joint source-channel coding as an example to describe in detail the encoding method based on a systematic polar code provided in embodiments of this application.

FIG. 6 is a schematic flowchart of an example encoding method 600 based on a systematic polar code according to an embodiment of this application. The method 600 may be performed by a sending device, for example, a terminal device or a network device. The method 600 may be applied to the communication system 100 shown in FIG. 1, or may be applied to another communication system. This is not limited in this embodiment of this application.

As shown in FIG. 6, the method 600 may include the following steps.

S601: Obtain an input information bit sequence.

For example, the input information bit sequence may be a binary row vector whose length is N, where N is an integer greater than or equal to 1.

The input information bit sequence may also be referred to as to-be-encoded information or a to-be-encoded bit sequence. This is not limited in this embodiment of this application.

S602: Determine a target matrix based on a first polar code generation matrix and a transformation matrix.

The first polar code generation matrix is a polar code generation matrix in the conventional technology. A dimension of the first polar code generation matrix is not limited in this embodiment of this application. For example, the first polar code generation matrix may be $G_N = F^{\otimes n}$, where $$F = \begin{bmatrix} 1 & 0 \\ 1 & 1 \end{bmatrix},$$

and N represents that the first polar code generation matrix is N×N-dimensional.

Sub-block column transformation may be understood as that column transformation is performed on a submatrix. To be specific, column transformation may be performed on a submatrix of the first polar code generation matrix by using the transformation matrix, to obtain a polar code generation matrix that is based on the sub-block column transformation. A sending device may perform encoding by using the polar code generation matrix that is based on the sub-block column transformation.

In comparison with an original encoding manner, this encoding manner can change an encoding sequence of intermediate results in an encoding process, objectively achieve an effect of performing sub-block column transformation on the polar code generation matrix, and improve performance of a code spectrum.

For example, in the diagram of encoding shown in FIG. 3, the intermediate results in the encoding process may include $v_1, v_2, v_3, v_4, v_5, v_6, v_7, v_8, w_1, w_2, w_3, w_4, w_5, w_6, w_7$, and $w_8$. The transformation matrix may change at least two of a plurality of intermediate results. For example, the transformation matrix may change a sequence of $w_1, w_2, w_3$, and $w_4$, so that a subsequent encoding result changes.

The sending device may determine the target matrix based on the first polar code generation matrix and the transformation matrix. The sending device may determine the target matrix in a plurality of implementations.

In a possible implementation, the target matrix is a result of multiplying the first polar code generation matrix by the transformation matrix.

In another possible implementation, the target matrix is a result of multiplying the transformation matrix by the first polar code generation matrix.

S603: Encode the input information bit sequence based on an inverse matrix of a first matrix, to obtain a first bit sequence, where the input information bit sequence is a bit sequence corresponding to an information bit, and the first matrix is a submatrix formed by a row corresponding to the information bit and a column corresponding to the information bit that are in the target matrix.

The sending device determines the target matrix in S602, then forms the submatrix by using the row corresponding to the information bit and the column corresponding to the information bit that are in the target matrix, to obtain the first matrix, and encodes the input information bit sequence based on the inverse matrix of the first matrix, to obtain the first bit sequence. The input information bit sequence is the bit sequence corresponding to the information bit, and may be represented by a symbol ux. However, this embodiment of this application is not limited thereto.

It should be understood that, in an encoding manner based on a systematic polar code, an encoded codeword includes an original information bit, and $x_A = u_A$ may be obtained.

For example, if the target matrix is represented by a symbol Q, and A represents the information bit, the first matrix may be represented by a symbol $Q_{AA}$. If the input information bit sequence is represented by $u_1$, the first bit sequence may be $u_N \cdot Q_{AA}^{-1}$ or $x_A \cdot Q_{AA}^{-1}$.

S604: Encode the first bit sequence based on a second matrix, to obtain a second bit sequence, where the second matrix is a submatrix formed by the row corresponding to the information bit and a column corresponding to a frozen bit that are in the target matrix.

The sending device determines the target matrix in S602, then forms the submatrix by using the row corresponding to the information bit and the column corresponding to the frozen bit, to obtain the second matrix, and encodes the first bit sequence based on the second matrix, to obtain the second bit sequence.

For example, if the target matrix is represented by a symbol Q, A represents the information bit, and $A^C$ represents the frozen bit, the second matrix may be represented by a symbol $Q_{AA}{}^c$. If the first bit sequence is $x_A \cdot Q_{AA}^{-1}$, the second bit sequence may be $x_{A^c} = x_A \cdot Q_{AA}^{-1} \cdot Q_{AA}{}^c$. In a scenario of joint source-channel coding, the sending device outputs $x_{A^c}$.

S605: Output the second bit sequence.

The sending device performs source and channel encoding on the input information bit sequence in S602 to S604, to obtain the second bit sequence, and outputs the second bit sequence, to perform rate matching and modulation. After operations such as the rate matching and the modulation are performed, the second bit sequence is sent to a receiving device through a channel.

Optionally, the input information bit sequence may be Bernoulli distribution whose distribution probability is P. When sending the second bit sequence $x_{A^c}$ to the receiving device, the sending device may further send the distribution probability P of the Bernoulli distribution to the receiving device. The receiving device may decode the second bit sequence $x_{A^c}$ based on the received distribution probability P of the Bernoulli distribution.

For example, the receiving device may calculate a channel received log-likelihood ratio (LLR), where a length of the channel received log-likelihood ratio may be N. The receiving device may calculate an LLR 1 based on the received distribution probability P of the Bernoulli distribution, where a length of the LLR 1 may be K, add the LLR1 to a value of a location corresponding to an LLR information bit, and finally decode $x_{A^c}$ based on an inverse operation of the foregoing encoding process.

In the encoding method based on a systematic polar code provided in this embodiment of this application, column transformation is performed on the submatrix of the first polar code generation matrix by using the transformation matrix, to obtain the target matrix, and the input bit sequence is encoded by using the submatrix of the target matrix, namely, the first matrix and the second matrix, so that a quantity of codewords with a minimum code distance can be reduced, the performance of the code spectrum can be improved, and better bit error rate performance can be obtained.

There are a plurality of possible implementations of S602 in which the target matrix is determined based on the first polar code generation matrix and the transformation matrix. The following describes in detail the plurality of possible implementations.

The transformation matrix may include one matrix, or may include two or more than two matrices. This is not limited in this embodiment of this application.

When the transformation matrix includes one matrix, this embodiment of this application provides three possible implementations.

In the 1$^{st}$ possible implementation, the target matrix may be P·G, where G is the first polar code generation matrix, P is the transformation matrix, the first matrix is $(P \cdot G)_{AA}$, and the second matrix is $(P \cdot G)_{AA}{}^c$, where A represents the information bit, and $A^C$ represents the frozen bit.

Figure 7:
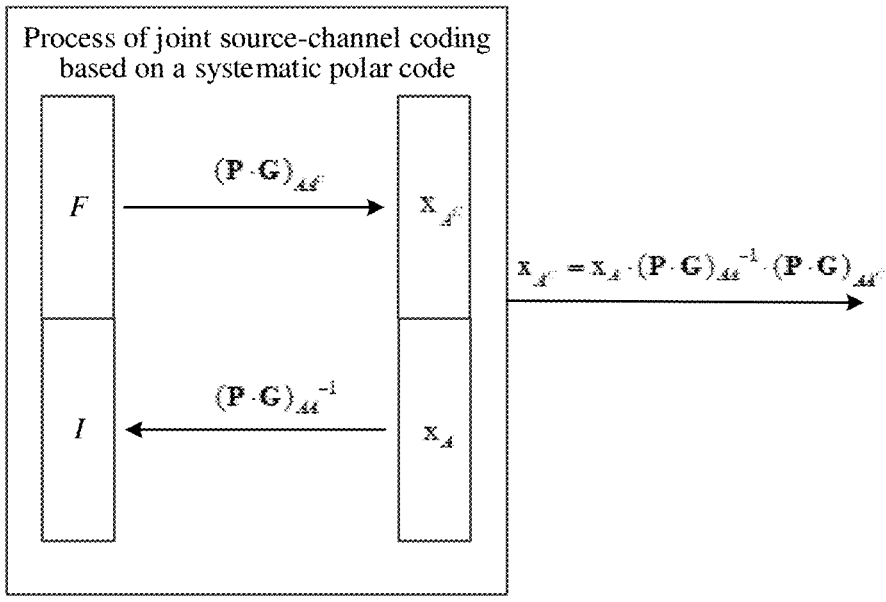
FIG. 7 is a diagram of an example joint source-channel coding method based on a systematic polar code according to an embodiment of this application.

For example, FIG. 7 shows an example systematic polar code based encoding manner. The sending device encodes the input bit sequence $x_A$ based on the inverse matrix $(P \cdot G)_A{}^{c-1}$ of the first matrix, to obtain the first bit sequence $I = x_A \cdot (P \cdot G)_{AA}^{-1}$, and encodes the first bit sequence $x_A \cdot (P \cdot G)_{AA}^{-1}$ based on the second matrix $(P \cdot G)_{AA}{}^c$, to obtain the second bit sequence $x_{A^c} = x_A \cdot (P \cdot G)_{AA}^{-1} \cdot (P \cdot G)_{AA}{}^c$. In the scenario of the joint source-channel coding, the sending device outputs $x_{A^c}$.

Optionally, the input information bit sequence $x_A$ may be the Bernoulli distribution whose distribution probability is P. When sending the second bit sequence $x_{A^c}$ to the receiving device, the sending device may further send the distribution probability P of the Bernoulli distribution to the receiving device. The receiving device may decode the second bit sequence $x_{A^c}$ based on the received distribution probability P of the Bernoulli distribution and the transformation matrix P.

For example, the receiving device may calculate the channel received log-likelihood ratio (LLR), where the length of the channel received log-likelihood ratio may be N. The receiving device may calculate the LLR 1 based on the received distribution probability P of the Bernoulli distribution, where the length of the LLR 1 may be K, add the LLR 1 to the value of the location corresponding to the LLR information bit, and finally decode $x_{A^c}$ based on the inverse operation of the encoding process in which the transformation matrix P participates.

Optionally, the transformation matrix P may be expressed as:

$$P = \begin{bmatrix} (G_{N/2})_{premute} \cdot G_{N/2} & 0 \\ 0 & I \end{bmatrix},$$

where $G_{N/2}$ is a second polar code generation matrix, N/2 represents that the second polar code generation matrix is N/2×N/2-dimensional, N represents that the first polar code generation matrix is N×N-dimensional, $(G_{N/2})_{premute}$ is a matrix obtained through first preset column transformation of $G_{N/2}$, 0 is a zero matrix of N/2×N/2, and I is a unit matrix of N/2×N/2.

It should be understood that a dimension of the second polar code generation matrix and a dimension of the first polar code generation matrix are merely examples. This is not limited in this embodiment of this application.

The first preset column transformation may be random column transformation. For example, the first preset column transformation may be for exchanging the $3^{rd}$ column and the $1^{st}$ column in the second polar code generation matrix. This is not limited in this embodiment of this application.

The transformation matrix obtained through the first preset column transformation may achieve an effect of performing sub-block column transformation on the first polar code generation matrix. The foregoing method is performed by using the transformation matrix. This helps reduce the quantity of codewords with the minimum code distance, and improve the performance of the code spectrum.

Optionally, the transformation matrix P may be obtained by using a matrix S, where P=G·S·G, G is the first polar code generation matrix, and the matrix S is expressed as:

$$S = \begin{bmatrix} G_{N/2} \cdot (G_{N/2})_{premute} & 0 \\ I - G_{N/2} \cdot (G_{N/2})_{premute} & I \end{bmatrix},$$

where $G_{N/2}$ is the second polar code generation matrix, N/2 represents that the second polar code generation matrix is N/2×N/2-dimensional, N represents that the first polar code generation matrix is N×N-dimensional, $(G_{N/2})_{permute}$ is the matrix obtained through the first preset column transformation of $G_{N/2}$, 0 is the zero matrix of N/2×N/2, and I is the unit matrix of N/2×N/2.

G is the first polar code generation matrix, where $G=G^{-1}$. Therefore, P=G·S·G may also be described as $P=G·S·G^{-1}$. This is not limited in this embodiment of this application.

In the $2^{nd}$ possible implementation, the target matrix is G·S, where G is the first polar code generation matrix, S is the transformation matrix, the first matrix is $(G·S)_{AA}$, and the second matrix is $(G·S)_{AA^c}$, where A represents the information bit, and $A^C$ represents the frozen bit.

Figure 8:
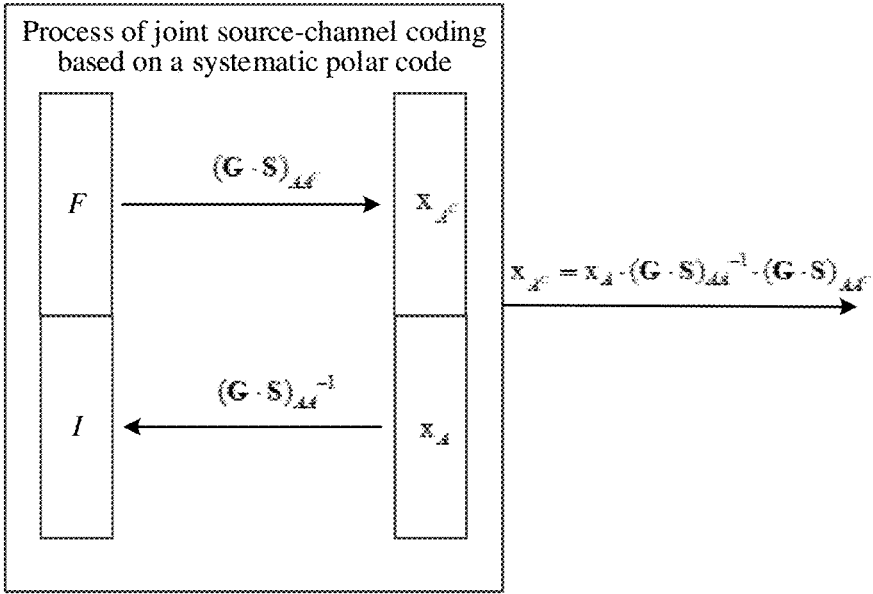
FIG. 8 is another diagram of an example joint source-channel coding method based on a systematic polar code according to an embodiment of this application.

For example, FIG. 8 shows an example systematic polar code based encoding manner. The sending device encodes the input bit sequence $x_A$ based on the inverse matrix $(G·S)_{AA}^{-1}$ of the first matrix, to obtain the first bit sequence $I=x_A·(G·S)_{AA}^{-1}$, and encodes the first bit sequence $x_A·(G·S)_{AA}^{-1}$ based on the second matrix $(G·S)_{AA^c}$, to obtain the second bit sequence $x_{A^c}=x_A·(G·S)_{AA}^{-1}·(G·S)_{AA^c}$. In the scenario of the joint source-channel coding, the sending device outputs $x_{A^c}$.

Optionally, the input information bit sequence $x_A$ may be the Bernoulli distribution whose distribution probability is P. When sending the second bit sequence $x_{A^c}$ to the receiving device, the sending device may further send the distribution probability P of the Bernoulli distribution to the receiving device. The receiving device may decode the second bit sequence $x_{A^c}$ based on the received distribution probability P of the Bernoulli distribution and the transformation matrix S.

For example, the receiving device may calculate the channel received log-likelihood ratio (LLR), where the length of the channel received log-likelihood ratio may be N. The receiving device may calculate the LLR 1 based on the received distribution probability P of the Bernoulli distribution, where the length of the LLR 1 may be K, add the LLR 1 to the value of the location corresponding to the LLR information bit, and finally decode $x_{A^c}$ based on the inverse operation of the encoding process in which the transformation matrix S participates.

Optionally, the transformation matrix S may be expressed as:

$$S = \begin{bmatrix} G_{N/2} \cdot (G_{N/2})_{premute} & 0 \\ I - G_{N/2} \cdot (G_{N/2})_{premute} & I \end{bmatrix},$$

where $G_{N/2}$ is a second polar code generation matrix, N/2 represents that the second polar code generation matrix is N/2×N/2-dimensional, N represents that the first polar code generation matrix is N×N-dimensional, $(G_{N/2})_{premute}$ is a matrix obtained through first preset column transformation of $G_{N/2}$, 0 is a zero matrix of N/2×N/2, and I is a unit matrix of N/2×N/2.

It should be understood that a dimension of the second polar code generation matrix and a dimension of the first polar code generation matrix are merely examples. This is not limited in this embodiment of this application.

The first preset column transformation may be random column transformation. For example, the first preset column transformation may be for exchanging the $3^{rd}$ column and the 1st column in the second polar code generation matrix. This is not limited in this embodiment of this application.

Optionally, the transformation matrix S may be obtained by using a matrix P, where S=G·P·G, G is the first polar code generation matrix, and the matrix P is expressed as the following formula:

$$P = \begin{bmatrix} (G_{N/2})_{premute} \cdot G_{N/2} & 0 \\ 0 & I \end{bmatrix},$$

where $G_{N/2}$ is the second polar code generation matrix, N/2 represents that the second polar code generation matrix is N/2×N/2-dimensional, N represents that the first polar code generation matrix is N×N-dimensional, $(G_{N/2})_{permute}$ is the matrix obtained through the first preset column transformation of $G_{N/2}$, 0 is the zero matrix of N/2×N/2, and I is the unit matrix of N/2×N/2.

G is the first polar code generation matrix, where $G=G^{-1}$. Therefore, P=G·S·G may also be described as $P=G·S·G^{-1}$. This is not limited in this embodiment of this application.

It should be noted that, in the $1^{st}$ possible implementation and the $2^{nd}$ possible implementation, the first preset column transformation is the same, and finally obtained second bit sequences are the same. Therefore, although the implementations are different, same effects are achieved. To be specific, the quantity of codewords with the minimum code distance can be reduced, the performance of the code spectrum can be improved, and the better bit error rate performance can be obtained.

In the $3^{rd}$ possible implementation, the target matrix is T·G, where G is the first polar code generation matrix, T is the transformation matrix and is an upper triangular matrix, the first matrix is $(T·G)_{AA}$, and the second matrix is $(T·G)_{AA}c$, where A represents the information bit, and $A^{C}$ represents the frozen bit.

T may be any upper triangular matrix, for example, a Toeplitz matrix.

Figure 9:
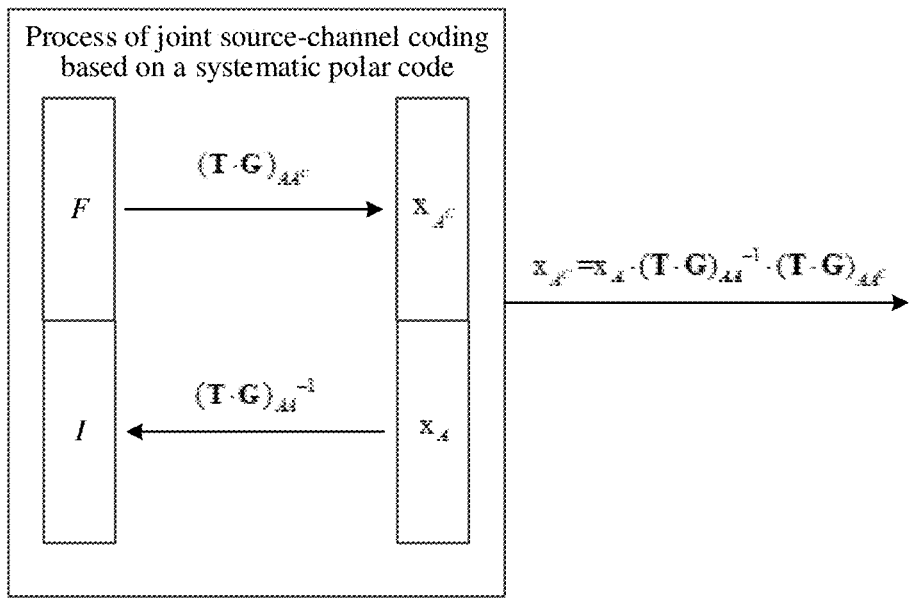
FIG. 9 is still another diagram of an example joint source-channel coding method based on a systematic polar code according to an embodiment of this application.

For example, FIG. 9 shows an example systematic polar code based encoding manner. The sending device encodes the input bit sequence $x_A$ based on the inverse matrix $(T·G)_{AA}^{-1}$ of the first matrix, to obtain the first bit sequence $I=x_4·(T·G)_{AA}^{-1}$, and encodes the first bit sequence $x_A·(T·G)_{AA}^{-1}$ based on the second matrix $(T·G)_{AA}c$, to obtain the second bit sequence $x_Ac=x_A·(T·G)_{AA}^{-1}·(T·G)_{AA}c$. In the scenario of the joint source-channel coding, the sending device outputs $x_Ac$.

Optionally, the input information bit sequence $x_A$ may be the Bernoulli distribution whose distribution probability is P. When sending the second bit sequence $x_Ac$ to the receiving device, the sending device may further send the distribution probability P of the Bernoulli distribution to the receiving device. The receiving device may decode the second bit sequence $x_Ac$ based on the received distribution probability P of the Bernoulli distribution and the transformation matrix T.

For example, the receiving device may calculate the channel received log-likelihood ratio (LLR), where the length of the channel received log-likelihood ratio may be N. The receiving device may calculate the LLR 1 based on the received distribution probability P of the Bernoulli distribution, where the length of the LLR 1 may be K, add the LLR 1 to the value of the location corresponding to the LLR information bit, and finally decode $x_Ac$ based on the inverse operation of the encoding process in which the transformation matrix T participates.

It should be noted that, the $3^{rd}$ possible implementation is different from the implementations of the $1^{st}$ possible implementation and the $2^{nd}$ possible implementation, but the quantity of codewords with the minimum code distance can be reduced, the performance of the code spectrum can be improved, and the better bit error rate performance can be obtained.

When the transformation matrix includes two matrices, for example, the transformation matrix includes a first transformation matrix and a second transformation matrix, the first transformation matrix and the second transformation matrix may achieve an effect of performing sub-block column transformation on the first polar code generation matrix. This embodiment of this application provides two possible implementations.

In the $1^{st}$ possible implementation, the target matrix is $P_2·P_1·G$, where G is the first polar code generation matrix, $P_1$ is the first transformation matrix, $P_2$ is the second transformation matrix, the first matrix is $(P_2·P_1·G)_{AA}$, and the second matrix is $(P_2·P_1·G)_{AA}c$, where A represents the information bit, and $A^{C}$ represents the frozen bit.

Figure 10:
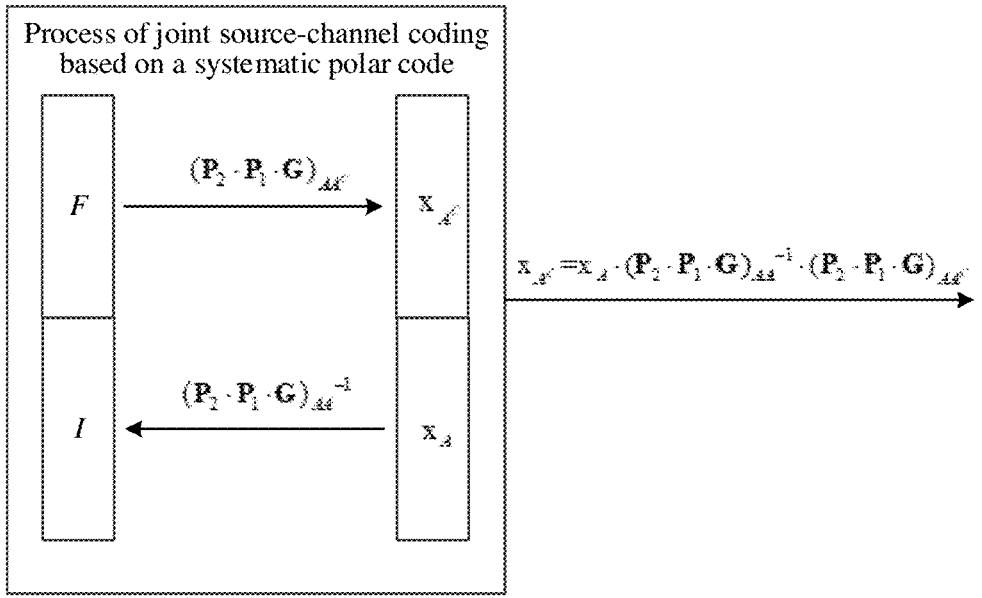
FIG. 10 is another diagram of an example joint source-channel coding method based on a systematic polar code according to an embodiment of this application.

For example, FIG. 10 shows an example systematic polar code based encoding manner. The sending device encodes the input bit sequence $x_A$ based on the inverse matrix $(P_2·P_1·G)_{AA}^{-1}$ of the first matrix, to obtain the first bit sequence $I=x_4·(P_2·P_1·G)_{AA}^{-1}$, and encodes the first bit sequence $x_A·(P_2·P_1·G)_{AA}^{-1}$ based on the second matrix $(P_2·P_1·G)_{AA}c$, to obtain the second bit sequence $x_Ac=x_A·(P_2·P_1·G)_{AA}^{-1}·(P_2·P_1·G)_{AA}c$. In the scenario of the joint source-channel coding, the sending device outputs $x_Ac$.

Optionally, the input information bit sequence $x_A$ may be the Bernoulli distribution whose distribution probability is P. When sending the second bit sequence $x_Ac$ to the receiving device, the sending device may further send the distribution probability P of the Bernoulli distribution to the receiving device. The receiving device may decode the second bit sequence $x_Ac$ based on the received distribution probability P of the Bernoulli distribution, the first transformation matrix $P_1$, and the second transformation matrix $P_2$.

For example, the receiving device may calculate the channel received log-likelihood ratio (LLR), where the length of the channel received log-likelihood ratio may be N. The receiving device may calculate the LLR 1 based on the received distribution probability P of the Bernoulli distribution, where the length of the LLR 1 may be K, add the LLR 1 to the value of the location corresponding to the LLR information bit, and finally decode $x_Ac$ based on the inverse operation of the encoding process in which the first transformation matrix $P_1$ and the second transformation matrix $P_2$ participates.

Optionally, the first transformation matrix $P_1$ is expressed as:

$$P_1 = \begin{bmatrix} A & 0 \\ 0 & B \end{bmatrix},$$

where $$A = \begin{bmatrix} (G_{N/4})_{permute1}·G_{N/4} & 0 \\ 0 & I \end{bmatrix},$$

$$B = \begin{bmatrix} (G_{N/4})_{permute2}·G_{N/4} & 0 \\ 0 & I \end{bmatrix},$$

$G_{N/4}$ is a third polar code generation matrix, N/4 represents that the third polar code generation matrix is N/4×N/4-dimensional, N represents that the first systematic polar code generation matrix is N×N-dimensional, $(G_{N/4})_{premute1}$ is a matrix obtained through second preset column transformation of $G_{N/4}$, 0 is a zero matrix, I is a unit matrix of N/4×N/4, and $(G_{N/4})_{premute2}$ is a matrix obtained through third preset column transformation of $G_{N/4}$.

The second preset column transformation and the third preset column transformation may be the same, or may be different. This is not limited in this embodiment of this application.

The third preset column transformation may be random column transformation, and the second preset column transformation may also be random column transformation.

For example, the third preset column transformation may be for exchanging the $3^{rd}$ column and the $1^{st}$ column in the third polar code generation matrix, and the second preset column transformation may be for exchanging the $2^{nd}$ column and the $1^{st}$ column in the third polar code generation matrix.

For another example, the third preset column transformation may be for exchanging the $3^{rd}$ column and the $1^{st}$ column in the third polar code generation matrix, and the second preset column transformation may also be for exchanging the $3^{rd}$ column and the $1^{st}$ column in the third polar code generation matrix.

If the second preset column transformation and the third preset column transformation are the same, from a perspective of a method, the first transformation matrix may be obtained through same preset column transformation, where the method is simple and has high universality. From a perspective of hardware, the second preset column transformation and the third preset column transformation may reuse a same set of devices, where a structure is simple and costs are reduced.

If the second preset column transformation and the third preset column transformation are different, the first transformation matrix may be obtained through different preset column transformation. This is applicable to different cases, is flexible, and has a wide application scope.

It should be noted that zero matrices in a matrix A and a matrix B are N/4×N/4-dimensional, and the zero matrix in the first transformation matrix $P_1$ is N/2×N/2-dimensional.

Optionally, the second transformation matrix $P_2$ is expressed as:

$$P_2 = \begin{bmatrix} C & 0 \\ 0 & I \end{bmatrix}, \text{where}$$

$$C = \begin{bmatrix} (G_{N/4})_{permute1} & 0 \\ G_{N/4} & G_{N/4} \end{bmatrix}_{permute3} \cdot \begin{bmatrix} (G_{N/4})_{permute1} & 0 \\ G_{N/4} & G_{N/4} \end{bmatrix}^{-1},$$

$$\begin{bmatrix} (G_{N/4})_{permute1} & 0 \\ G_{N/4} & G_{N/4} \end{bmatrix}_{permute3}$$

is a matrix obtained through fourth preset column transformation of $$\begin{bmatrix} (G_{N/4})_{permute1} & 0 \\ G_{N/4} & G_{N/4} \end{bmatrix},$$

$G_{N/4}$ is the third polar code generation matrix, N/4 represents that the third polar code generation matrix is N/4×N/4-dimensional, N represents that the first polar code generation matrix is N×N-dimensional, 0 is the zero matrix, and I is a unit matrix of N/2×N/2.

It should be noted that a zero matrix in a matrix C is N/4×N/4-dimensional, and the zero matrix in the second transformation matrix $P_2$ is N/2×N/2-dimensional.

The fourth preset column transformation may be random column transformation, and is different from the second preset column transformation and the third preset column transformation. The first transformation matrix and the second transformation matrix may be obtained through the second preset column transformation, the third preset column transformation, and the fourth preset column transformation. The first transformation matrix and the second transformation matrix may achieve an effect of performing column transformation on more submatrices of the first polar code generation matrix. The foregoing method is performed by using the first transformation matrix and the second transformation matrix. This helps reduce the quantity of codewords with the minimum code distance, and improve the performance of the code spectrum.

Optionally, the first transformation matrix $P_1$ and the second transformation matrix $P_2$ may be obtained by using a matrix $S_1$ and a matrix $S_2$, where $P_1 \cdot P_2 = G \cdot S_1 \cdot S_2 \cdot G$, G is the first polar code generation matrix, and the matrix $S_1$ is expressed as:

$$S_1 = \begin{bmatrix} D & 0 \\ I-D & I \end{bmatrix}, \text{where}$$

$$D = \begin{bmatrix} (G_{N/4})_{permute1} & 0 \\ G_{N/4} & G_{N/4} \end{bmatrix}^{-1} \cdot \begin{bmatrix} (G_{N/4})_{permute1} & 0 \\ G_{N/4} & G_{N/4} \end{bmatrix}_{permute3},$$

$G_{N/4}$ is the third polar code generation matrix, N/4 represents that the third polar code generation matrix is N/4×N/4-dimensional, N represents that the first polar code generation matrix is N×N-dimensional, $(G_{N/4})_{premute1}$ is the matrix obtained through the second preset column transformation of $G_{N/4}$, $$\begin{bmatrix} (G_{N/4})_{permute1} & 0 \\ G_{N/4} & G_{N/4} \end{bmatrix}_{permute3}$$

is the matrix obtained through the fourth preset column transformation $$\begin{bmatrix} (G_{N/4})_{permute1} & 0 \\ G_{N/4} & G_{N/4} \end{bmatrix},$$

of 0 is the zero matrix, and I is a unit matrix; and the matrix $S_2$ is expressed as:

$$S_2 = \begin{bmatrix} J & 0 \\ K & M \end{bmatrix}, \text{where}$$

$$J = \begin{bmatrix} G_{N/4} \cdot (G_{N/4})_{permute1} & 0 \\ I - G_{N/4} \cdot (G_{N/4})_{permute1} & I \end{bmatrix},$$

$$K = \begin{bmatrix} G_{N/4} \cdot (G_{N/4})_{permute2} - G_{N/4} \cdot (G_{N/4})_{permute1} & 0 \\ G_{N/4} \cdot (G_{N/4})_{permute1} - G_{N/4} \cdot (G_{N/4})_{permute2} & 0 \end{bmatrix},$$

$$M = \begin{bmatrix} G_{N/4} \cdot (G_{N/4})_{permute2} & 0 \\ I - G_{N/4} \cdot (G_{N/4})_{permute2} & I \end{bmatrix},$$

and $(G_{N/4})_{permute2}$ is the matrix obtained through the third preset column transformation of $G_{N/4}$.

It should be noted that a zero matrix in a matrix D is N/4×N/4-dimensional, the zero matrix in the matrix $S_1$ is N/2×N/2-dimensional, zero matrices in a matrix J, a matrix K, and a matrix M are N/4×N/4-dimensional, and the zero matrix in the matrix $S_2$ is N/2×N/2-dimensional.

In the $2^{nd}$ possible implementation, the target matrix is $G \cdot S_2 \cdot S_1$, where G is the first polar code generation matrix, $S_1$ is the first transformation matrix, $S_2$ is the second transformation matrix, the first matrix is $(G \cdot S_2 \cdot S_1)_{AA}$, and the second matrix is $(G \cdot S_2 \cdot S_1)_{AA^C}$, where A represents the information bit, and $A^C$ represents the frozen bit.

Figure 11:
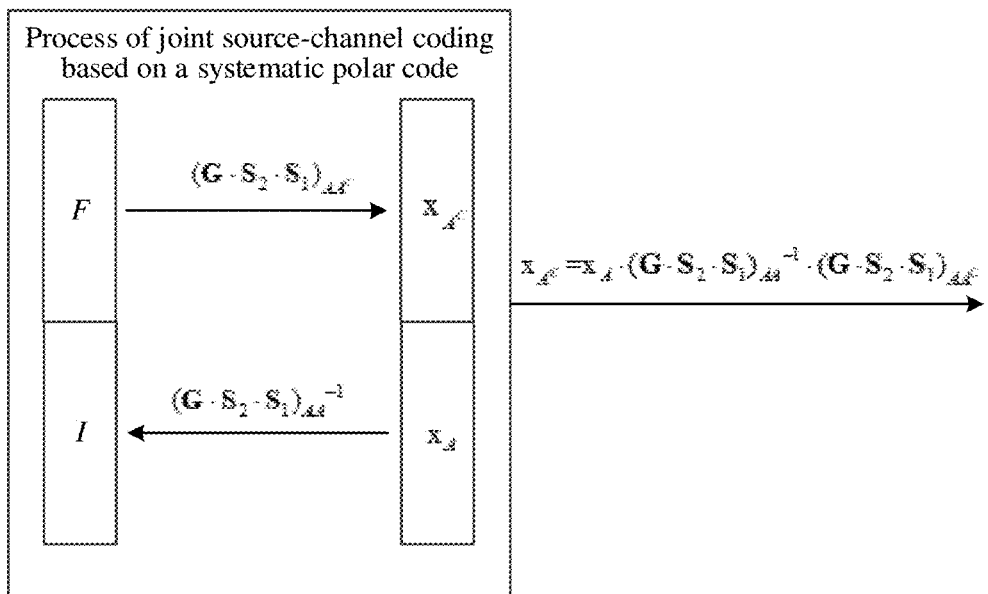
FIG. 11 is still another diagram of an example joint source-channel coding method based on a systematic polar code according to an embodiment of this application.

For example, FIG. 11 shows an example systematic polar code based encoding manner. The sending device encodes the input bit sequence $x_A$ based on the inverse matrix $(G \cdot S_2 \cdot S_1)_{AA}^{-1}$ of the first matrix, to obtain the first bit sequence $I = x_A \cdot (G \cdot S_2 \cdot S_1)_{AA}^{-1}$, and encodes the first bit sequence $x_A \cdot (G \cdot S_2 \cdot S_1)_{AA}^{-1}$ based on the second matrix $(G \cdot S_2 \cdot S_1)_{AA^c}$, to obtain the second bit sequence $x_{A^c} = x_A \cdot (G \cdot S_2 \cdot S_1)_{AA}^{-1} \cdot (G \cdot S_2 \cdot S_1)_{AA^c}$. In the scenario of the joint source-channel coding, the sending device outputs $x_{A^c}$.

Optionally, the input information bit sequence $x_A$ may be the Bernoulli distribution whose distribution probability is P. When sending the second bit sequence $x_{A^c}$ to the receiving device, the sending device may further send the distribution probability P of the Bernoulli distribution to the receiving device. The receiving device may decode the second bit sequence $x_{A^c}$ based on the received distribution probability P of the Bernoulli distribution, the first transformation matrix $S_1$, and the second transformation matrix $S_2$.

For example, the receiving device may calculate the channel received log-likelihood ratio (LLR), where the length of the channel received log-likelihood ratio may be N. The receiving device may calculate the LLR 1 based on the received distribution probability P of the Bernoulli distribution, where the length of the LLR 1 may be K, add the LLR 1 to the value of the location corresponding to the LLR information bit, and finally decode $x_{A^c}$ based on the inverse operation of the encoding process in which the first transformation matrix $S_1$ and the second transformation matrix $S_2$ participates.

Optionally, the first transformation matrix $S_1$ is expressed as:

$$S_1 = \begin{bmatrix} D & 0 \\ I-D & I \end{bmatrix}, \text{ where}$$

$$D = \begin{bmatrix} (G_{N/4})_{permute1} & 0 \\ G_{N/4} & G_{N/4} \end{bmatrix}^{-1} \cdot \begin{bmatrix} (G_{N/4})_{permute1} & 0 \\ G_{N/4} & G_{N/4} \end{bmatrix}_{permute3},$$

$G_{N/4}$ is a third polar code generation matrix, N/4 represents that the third polar code generation matrix is N/4×N/4-dimensional, N represents that the first polar code generation matrix is N×N-dimensional, $(G_{N/4})_{premute1}$ is a matrix obtained through second preset column transformation of $G_{N/4}$, $$\begin{bmatrix} (G_{N/4})_{permute1} & 0 \\ G_{N/4} & G_{N/4} \end{bmatrix}_{permute3}$$

is a matrix obtained through fourth preset column transformation of $$\begin{bmatrix} (G_{N/4})_{permute1} & 0 \\ G_{N/4} & G_{N/4} \end{bmatrix},$$

0 is a zero matrix, and I is a unit matrix of N/2×N/2.

It should be noted that a zero matrix in a matrix D is N/4×N/4-dimensional, and the zero matrix in the matrix $S_1$ is N/2×N/2-dimensional.

Optionally, the second transformation matrix $S_2$ is expressed as:

$$S_2 = \begin{bmatrix} J & 0 \\ K & M \end{bmatrix}, \text{ where}$$

-continued $$J = \begin{bmatrix} G_{N/4} \cdot (G_{N/4})_{permute1} & 0 \\ I - G_{N/4} \cdot (G_{N/4})_{permute1} & I \end{bmatrix},$$

$$K = \begin{bmatrix} G_{N/4} \cdot (G_{N/4})_{permute2} - G_{N/4} \cdot (G_{N/4})_{permute1} & 0 \\ G_{N/4} \cdot (G_{N/4})_{permute1} - G_{N/4} \cdot (G_{N/4})_{permute2} & 0 \end{bmatrix},$$

$$M = \begin{bmatrix} G_{N/4} \cdot (G_{N/4})_{permute2} & 0 \\ I - G_{N/4} \cdot (G_{N/4})_{permute2} & I \end{bmatrix},$$

$G_{N/4}$ is the third polar code generation matrix, N/4 represents that the third systematic polar code generation matrix is N/4×N/4-dimensional, N represents that the first polar code generation matrix is N×N-dimensional, $(G_{N/4})_{permute1}$ is the matrix obtained through the second preset column transformation of $G_{N/4}$, $(G_{N/4})_{permute2}$ is a matrix obtained through third preset column transformation of $G_{N/4}$, 0 is the zero matrix, and I is a unit matrix of N/4×N/4.

The second preset column transformation and the third preset column transformation may be the same, or may be different. This is not limited in this embodiment of this application.

It should be noted that, zero matrices in a matrix J, a matrix K, and a matrix M are N/4×N/4-dimensional, and the zero matrix in the matrix $S_2$ is N/2×N/2-dimensional.

Optionally, the first transformation matrix $S_1$ and the second transformation matrix $S_2$ are obtained by using a matrix $P_1$ and a matrix $P_2$, where $S_1 \cdot S_2 = G \cdot P_1 \cdot P_2 \cdot G$, G is the first polar code generation matrix, and the matrix $P_1$ is expressed as:

$$P_1 = \begin{bmatrix} A & 0 \\ 0 & B \end{bmatrix}, \text{ where}$$

$$A = \begin{bmatrix} (G_{N/4})_{permute1} \cdot G_{N/4} & 0 \\ 0 & I \end{bmatrix},$$

$$B = \begin{bmatrix} (G_{N/4})_{permute2} \cdot G_{N/4} & 0 \\ 0 & I \end{bmatrix},$$

$G_{N/4}$ is the third polar code generation matrix, N/4 represents that the third polar code generation matrix is N/4×N/4-dimensional, N represents that the first polar code generation matrix is N×N-dimensional, $(G_{N/4})_{permute1}$ is the matrix obtained through the second preset column transformation of $G_{N/4}$, $(G_{N/4})_{permute2}$ is the matrix obtained through the third preset column transformation of $G_{N/4}$, 0 is the zero matrix, and I is a unit matrix; and the matrix $P_2$ is expressed as:

$$P_2 = \begin{bmatrix} C & 0 \\ 0 & I \end{bmatrix}, \text{ where}$$

$$C = \begin{bmatrix} (G_{N/4})_{permute1} & 0 \\ G_{N/4} & G_{N/4} \end{bmatrix}_{permute3} \cdot \begin{bmatrix} (G_{N/4})_{permute1} & 0 \\ G_{N/4} & G_{N/4} \end{bmatrix}^{-1}, \text{ and}$$

$$\begin{bmatrix} (G_{N/4})_{permute1} & 0 \\ G_{N/4} & G_{N/4} \end{bmatrix}_{permute3}$$

is the matrix obtained through the fourth preset column transformation of $$\begin{bmatrix} (G_{N/4})_{permute1} & 0 \\ G_{N/4} & G_{N/4} \end{bmatrix}.$$

It should be noted that zero matrices in a matrix A and a matrix B are $N/4 \times N/4$-dimensional, and the zero matrix in the matrix $P_1$ is $N/2 \times N/2$-dimensional. A zero matrix in a matrix C is $N/4 \times N/4$-dimensional, and the zero matrix in the matrix $P_2$ is $N/2 \times N/2$-dimensional.

It should be further noted that unit matrices in the matrix A and the matrix Bare $N/4 \times N/4$-dimensional, and the unit matrix in the matrix $P_2$ is $N/2 \times N/2$-dimensional.

When the transformation matrix includes two transformation matrices, in comparison with one transformation matrix, the two transformation matrices may achieve an effect of performing column transformation on more submatrices of the first polar code generation matrix. The foregoing method is performed by using the two matrices, so that an encoding sequence of more intermediate results in an encoding process can be changed.

For example, in the diagram of encoding shown in FIG. 3, the intermediate results in the encoding process may include $v_1$, $v_2$, $v_3$, $v_4$, $v_5$, $v_6$, $v_7$, $v_8$, $w_1$, $w_2$, $w_3$, $w_4$, $w_5$, $w_6$, $w_7$, and $w_8$. In comparison with one matrix, the two transformation matrices can change more intermediate results. For example, one transformation matrix may change a sequence of $w_1$, $w_2$, $w_3$, and $w_4$, and the two transformation matrices may change a sequence of $v_1$ and $v_2$, a sequence of $v_5$ and $v_6$, and a sequence of $w_1$, $w_2$, $w_3$, and $w_4$.

In the encoding method based on a systematic polar code provided in this embodiment of this application, the encoding sequence of more intermediate results in the encoding process is changed by using the two transformation matrices, and encoding is performed in a changed encoding sequence, so that more codewords with the minimum code distance can be reduced, the performance of the code spectrum can be further improved, and the better bit error rate performance can be obtained.

It should be noted that, in the implementations of the two transformation matrices, finally obtained second bit sequences are the same. Therefore, although the implementations are different, same effects are achieved.

To better describe an effect of the encoding method based on a systematic polar code provided in this embodiment of this application, this embodiment of this application provides a simulation effect diagram.

In a simulation process, in this embodiment of this application, a method in which the transformation matrix includes one matrix and the transformation matrix is P or S is referred to as "one time of transformation" for short, a method in which the transformation matrix includes one matrix and the transformation matrix is T is referred to as "PAC JSCC", a method in which the transformation matrix includes two matrices is referred to as "two times of transformation" for short, and a solution of the conventional technology is referred to as "JSCC".

Figure 12:
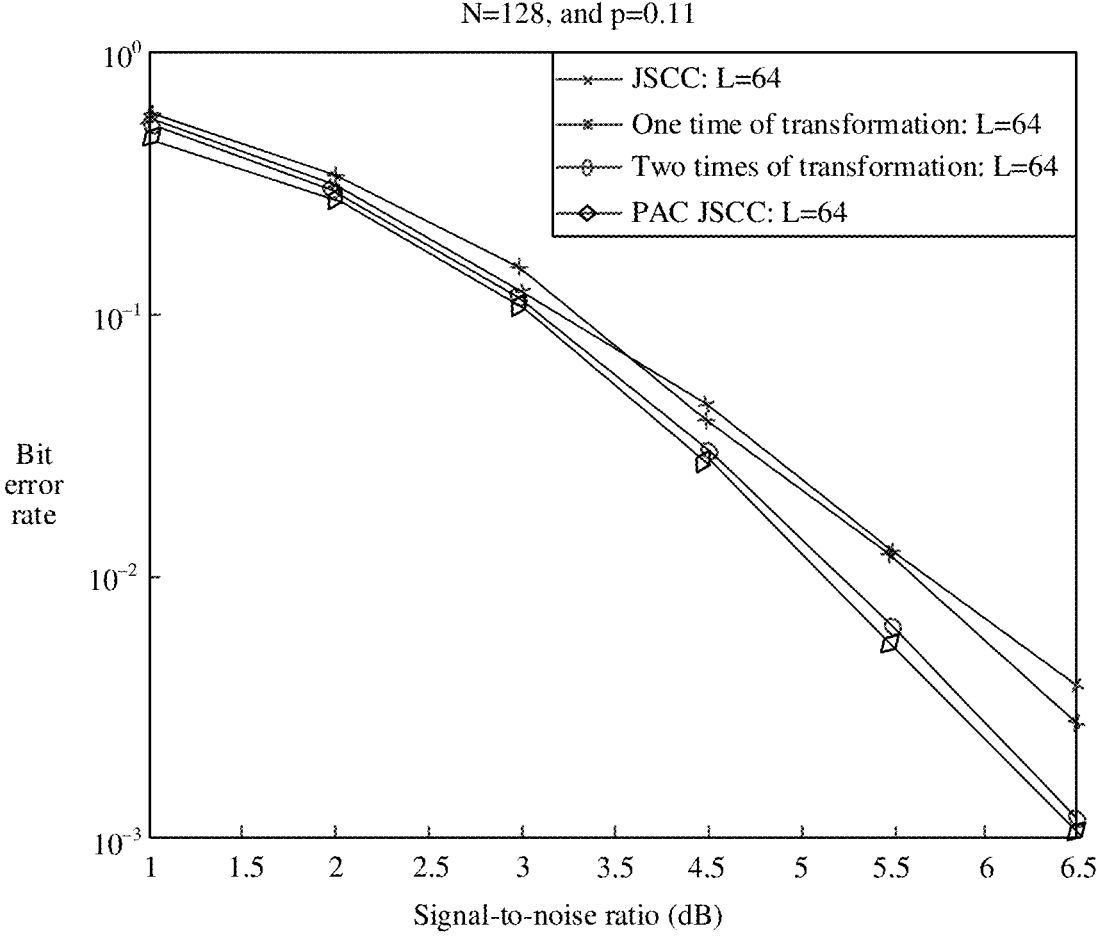
FIG. 12 is an example diagram of simulation according to an embodiment of this application.

For example, FIG. 12 is a diagram of an example simulation effect. As shown in FIG. 12, in this embodiment of this application, one time of transformation, PAC JSCC, two times of transformation, and JSCC encoding are separately performed on an input bit sequence of a length N=128, to compare bit error rate (BLER) performance of the input bit sequence in different signal-to-noise ratio conditions. The input bit sequence conforms to Bernoulli distribution with a distribution probability of P=0.11, column transformation in both the one time of transformation and the two times of transformation is random column transformation, a quantity of paths of each algorithm is L=64, and a unit of a signal-to-noise ratio is decibel (dB).

It can be learned from FIG. 12 that performance of the one time of transformation, the PAC JSCC, and the two times of transformation provided in this embodiment of this application is compared with that of the JSCC solution, so that the following may be obtained.

(1) A solution based on the one time of transformation is slightly better than the JSCC solution.

(2) Performance of a solution based on the two times of transformation is similar to that of a solution of the PAC JSCC, and both are much better than that of the JSCC solution. When a BLER is $4 \times 10^{-3}$, in comparison with the JSCC solution, the two solutions can obtain a gain of approximately 0.8 dB.

Figure 13:
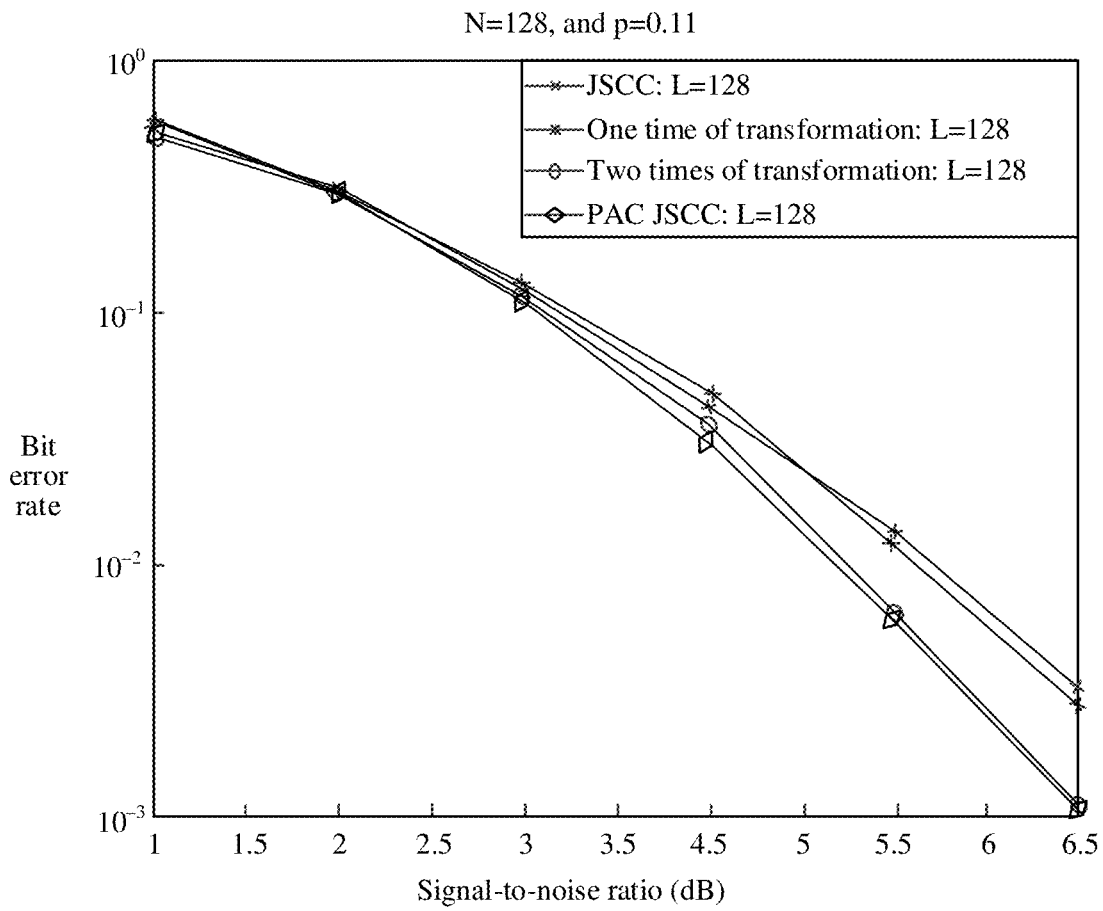
FIG. 13 is another example diagram of simulation according to an embodiment of this application.

For example, FIG. 13 is another diagram of an example simulation effect. As shown in FIG. 13, in this embodiment of this application, one time of transformation, PAC JSCC, two times of transformation, and JSCC encoding are separately performed on an input bit sequence of a length N=128, to compare bit error rate (BLER) performance of the input bit sequence in different signal-to-noise ratio conditions. The input bit sequence conforms to Bernoulli distribution with a distribution probability of P=0.11, column transformation in both the one time of transformation and the two times of transformation is random column transformation, a quantity of paths of each algorithm is L=128, and a unit of a signal-to-noise ratio is decibel (dB).

It can be learned from FIG. 13 that performance of the one time of transformation, the PAC JSCC, and the two times of transformation provided in this embodiment of this application is compared with that of the JSCC solution, so that the following may be obtained.

(1) A solution based on the one time of transformation is slightly better than the JSCC solution. When a BLER is $4 \times 10^{-3}$, a gain of 0.1 dB to 0.2 dB can be obtained.

(2) The performance of the solution based on the two times of transformation is similar to that of the solution of the PAC JSCC, and both are much better than that of the JSCC solution. When the BLER is $4 \times 10^{-3}$, in comparison with the JSCC solution, the two solutions can obtain a gain of approximately 0.8 dB.

The sequence numbers of the foregoing processes do not mean execution sequences. The execution sequences of the processes should be determined based on functions and internal logic of the processes, and should not constitute any limitation on implementation processes of embodiments of this application.

The foregoing describes in detail the encoding method based on a systematic polar code in embodiments of this application with reference to FIG. 1 to FIG. 13. The following describes in detail an encoding apparatus based on a systematic polar code in embodiments of this application with reference to FIG. 14 and FIG. 15.

Figure 14:
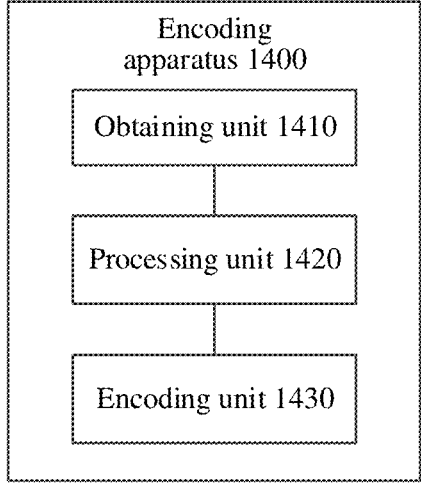
FIG. 14 is a schematic block diagram of an example encoding apparatus based on a systematic polar code according to an embodiment of this application.

FIG. 14 is a schematic block diagram of an example encoding apparatus 1400 based on a systematic polar code according to an embodiment of this application. The apparatus 1400 includes an obtaining unit 1410, a processing unit 1420, and an encoding unit 1430. The obtaining unit 1410 is configured to obtain an input information bit sequence. The processing unit 1420 is configured to determine a target matrix based on a first polar code generation matrix and a transformation matrix. The encoding unit 1430 is configured to: encode the input information bit sequence based on an inverse matrix of a first matrix, to obtain a first bit sequence, where the input information bit sequence is a bit sequence corresponding to an information bit, and the first matrix is a submatrix formed by a row corresponding to the information bit and a column corresponding to the information bit that are in the target matrix; and encode the first bit sequence based on a second matrix, to obtain a second bit sequence, where the second matrix is a submatrix formed by the row corresponding to the information bit and a column corresponding to a frozen bit that are in the target matrix.

Optionally, the target matrix is P·G, where G is the first polar code generation matrix, P is the transformation matrix, the first matrix is $(P·G)_{AA}$, and the second matrix is $(P·G)_{AA^C}$, where A represents the information bit, and $A^C$ represents the frozen bit.

Optionally, the transformation matrix P is expressed as:

$$P = \begin{bmatrix} (G_{N/2})_{premute} \cdot G_{N/2} & 0 \\ 0 & I \end{bmatrix},$$

where $G_{N/2}$ is a second polar code generation matrix, N/2 represents that the second polar code generation matrix is N/2×N/2-dimensional, N represents that the first polar code generation matrix is N×N-dimensional, $(G_{N/2})_{premute}$ is a matrix obtained through first preset column transformation of $G_{N/2}$, 0 is a zero matrix of N/2×N/2, and I is a unit matrix of N/2×N/2.

Optionally, the transformation matrix P is obtained by using a matrix S, where P=G·S·G, G is the first polar code generation matrix, and the matrix S is expressed as:

$$S = \begin{bmatrix} G_{N/2} \cdot (G_{N/2})_{premute} & 0 \\ I - G_{N/2} \cdot (G_{N/2})_{premute} & I \end{bmatrix},$$

where $G_{N/2}$ is the second polar code generation matrix, N/2 represents that the second polar code generation matrix is N/2×N/2-dimensional, N represents that the first polar code generation matrix is N×N-dimensional, $(G_{N/2})_{permute}$ is the matrix obtained through the first preset column transformation of $G_{N/2}$, 0 is the zero matrix of N/2×N/2, and I is the unit matrix of N/2×N/2.

Optionally, the target matrix is G·S, where G is the first polar code generation matrix, S is the transformation matrix, the first matrix is $(G·S)_{AA}$, and the second matrix is $(G·S)_{AA^C}$, where A represents the information bit, and $A^C$ represents the frozen bit.

Optionally, the transformation matrix S is expressed as:

$$S = \begin{bmatrix} G_{N/2} \cdot (G_{N/2})_{premute} & 0 \\ I - G_{N/2} \cdot (G_{N/2})_{premute} & I \end{bmatrix},$$

where $G_{N/2}$ is a second polar code generation matrix, N/2 represents that the second polar code generation matrix is N/2×N/2-dimensional, N represents that the first polar code generation matrix is N×N-dimensional, $(G_{N/2})_{premute}$ is a matrix obtained through first preset column transformation of $G_{N/2}$, 0 is a zero matrix of N/2×N/2, and I is a unit matrix of N/2×N/2.

Optionally, the transformation matrix S is obtained by using a matrix P, where S=G·P·G, G is the first polar code generation matrix, and the matrix P is expressed as:

$$P = \begin{bmatrix} (G_{N/2})_{premute} \cdot G_{N/2} & 0 \\ 0 & I \end{bmatrix},$$

34 where $G_{N/2}$ is the second polar code generation matrix, N/2 represents that the second polar code generation matrix is N/2×N/2-dimensional, N represents that the first polar code generation matrix is N×N-dimensional, $(G_{N/2})_{permute}$ is the matrix obtained through the first preset column transformation of $G_{N/2}$, 0 is the zero matrix of N/2×N/2, and I is the unit matrix of N/2×N/2.

Optionally, the transformation matrix includes a first transformation matrix and a second transformation matrix.

Optionally, the target matrix is $P_2·P_1·G$, where G is the first polar code generation matrix, $P_1$ is the first transformation matrix, $P_2$ is the second transformation matrix, the first matrix is $(P_2·P_1·G)_{AA}$, and the second matrix is $(P_2·P_1·G)_{AA^C}$, where A represents the information bit, and $A^C$ represents the frozen bit.

Optionally, the first transformation matrix $P_1$ is expressed as:

$$P_1 = \begin{bmatrix} A & 0 \\ 0 & B \end{bmatrix}, \text{ where}$$

$$A = \begin{bmatrix} (G_{N/4})_{permute1} \cdot G_{N/4} & 0 \\ 0 & I \end{bmatrix},$$

$$B = \begin{bmatrix} (G_{N/4})_{permute2} \cdot G_{N/4} & 0 \\ 0 & I \end{bmatrix},$$

$G_{N/4}$ is a third polar code generation matrix, N/4 represents that the third polar code generation matrix is N/4×N/4-dimensional, N represents that the first systematic polar code generation matrix is N×N-dimensional, $(G_{N/4})_{premute1}$ is a matrix obtained through second preset column transformation of $G_{N/4}$, 0 is a zero matrix, I is a unit matrix of N/4×N/4, and $(G_{N/4})_{premute2}$ is a matrix obtained through third preset column transformation of $G_{N/4}$.

Optionally, the second transformation matrix $P_2$ is expressed as:

$$P_2 = \begin{bmatrix} C & 0 \\ 0 & I \end{bmatrix}, \text{ where}$$

$$C = \begin{bmatrix} (G_{N/4})_{permute1} & 0 \\ G_{N/4} & G_{N/4} \end{bmatrix}_{permute3} \cdot \begin{bmatrix} (G_{N/4})_{permute1} & 0 \\ G_{N/4} & G_{N/4} \end{bmatrix}^{-1},$$

$$\begin{bmatrix} (G_{N/4})_{permute1} & 0 \\ G_{N/4} & G_{N/4} \end{bmatrix}_{permute3}$$

is a matrix obtained through fourth preset column transformation of $$\begin{bmatrix} (G_{N/4})_{permute1} & 0 \\ G_{N/4} & G_{N/4} \end{bmatrix},$$

is the third polar code generation matrix, N/4 represents that the third polar code generation matrix is N/4×N/4-dimensional, N represents that the first polar code generation matrix is N×N-dimensional, 0 is the zero matrix, and I is a unit matrix of N/2×N/2.

Optionally, the first transformation matrix $P_1$ and the second transformation matrix $P_2$ are obtained by using a matrix $S_1$ and a matrix $S_2$, where $P_1·P_2=G·S_1·S_2·G$, G is the first polar code generation matrix, and the matrix $S_1$ is expressed as:

$$S_1 = \begin{bmatrix} D & 0 \\ I-D & I \end{bmatrix}, \text{ where}$$

$$D = \begin{bmatrix} (G_{N/4})_{permute1} & 0 \\ G_{N/4} & G_{N/4} \end{bmatrix}^{-1} \cdot \begin{bmatrix} (G_{N/4})_{permute1} & 0 \\ G_{N/4} & G_{N/4} \end{bmatrix}_{permute3},$$

$G_{N/4}$ is the third polar code generation matrix, N/4 represents that the third polar code generation matrix is N/4×N/4-dimensional, N represents that the first polar code generation matrix is N×N-dimensional, $(G_{N/4})_{premute1}$ is the matrix obtained through the second preset column transformation of $G_{N/4}$, $$\begin{bmatrix} (G_{N/4})_{permute1} & 0 \\ G_{N/4} & G_{N/4} \end{bmatrix}_{permute3}$$

is the matrix obtained through the fourth preset column transformation of $$\begin{bmatrix} (G_{N/4})_{permute1} & 0 \\ G_{N/4} & G_{N/4} \end{bmatrix},$$

0 is the zero matrix, and I is a unit matrix; and
   the matrix $S_2$ is expressed as:

$$S_2 = \begin{bmatrix} J & 0 \\ K & M \end{bmatrix}, \text{ where}$$

$$J = \begin{bmatrix} G_{N/4} \cdot (G_{N/4})_{permute1} & 0 \\ I - G_{N/4} \cdot (G_{N/4})_{permute1} & I \end{bmatrix},$$

$$K = \begin{bmatrix} G_{N/4} \cdot (G_{N/4})_{permute2} - G_{N/4} \cdot (G_{N/4})_{permute1} & 0 \\ G_{N/4} \cdot (G_{N/4})_{permute1} - G_{N/4} \cdot (G_{N/4})_{permute2} & 0 \end{bmatrix},$$

$$M = \begin{bmatrix} G_{N/4} \cdot (G_{N/4})_{permute2} & 0 \\ I - G_{N/4} \cdot (G_{N/4})_{permute2} & I \end{bmatrix},$$

and $(G_{N/4})_{permute2}$ is the matrix obtained through the third preset column transformation of $G_{N/4}$.

Optionally, the target matrix is $G \cdot S_2 \cdot S_1$, where G is the first polar code generation matrix, $S_1$ is the first transformation matrix, $S_2$ is the second transformation matrix, the first matrix is $(G \cdot S_2 \cdot S_1)_{AA}$, and the second matrix is $(G \cdot S_2 \cdot S_1)_{AA^C}$, where A represents the information bit, and $A^C$ represents the frozen bit.

Optionally, the first transformation matrix $S_1$ is expressed as:

$$S_1 = \begin{bmatrix} D & 0 \\ I-D & I \end{bmatrix}, \text{ where}$$

$$D = \begin{bmatrix} (G_{N/4})_{permute1} & 0 \\ G_{N/4} & G_{N/4} \end{bmatrix}^{-1} \cdot \begin{bmatrix} (G_{N/4})_{permute1} & 0 \\ G_{N/4} & G_{N/4} \end{bmatrix}_{permute3},$$

$G_{N/4}$ is a third polar code generation matrix, N/4 represents that the third polar code generation matrix is N/4×N/4-dimensional, N represents that the first polar code generation matrix is N×N-dimensional, $(G_{N/4})_{premute1}$ is a matrix obtained through second preset column transformation of $G_{N/4}$, $$\begin{bmatrix} (G_{N/4})_{permute1} & 0 \\ G_{N/4} & G_{N/4} \end{bmatrix}_{permute3}$$

is a matrix obtained through fourth preset column transformation of $$\begin{bmatrix} (G_{N/4})_{permute1} & 0 \\ G_{N/4} & G_{N/4} \end{bmatrix},$$

0 is a zero matrix, and I is a unit matrix of N/2×N/2.
   Optionally, the second transformation matrix $S_2$ is expressed as:

$$S_2 = \begin{bmatrix} J & 0 \\ K & M \end{bmatrix}, \text{ where}$$

$$J = \begin{bmatrix} G_{N/4} \cdot (G_{N/4})_{permute1} & 0 \\ I - G_{N/4} \cdot (G_{N/4})_{permute1} & I \end{bmatrix},$$

$$K = \begin{bmatrix} G_{N/4} \cdot (G_{N/4})_{permute2} - G_{N/4} \cdot (G_{N/4})_{permute1} & 0 \\ G_{N/4} \cdot (G_{N/4})_{permute1} - G_{N/4} \cdot (G_{N/4})_{permute2} & 0 \end{bmatrix},$$

$$M = \begin{bmatrix} G_{N/4} \cdot (G_{N/4})_{permute2} & 0 \\ I - G_{N/4} \cdot (G_{N/4})_{permute2} & I \end{bmatrix},$$

$G_{N/4}$ is the third polar code generation matrix, N/4 represents that the third systematic polar code generation matrix is N/4×N/4-dimensional, N represents that the first polar code generation matrix is N×N-dimensional, $(G_{N/4})_{permute1}$ is the matrix obtained through the second preset column transformation of $G_{N/4}$, $(G_{N/4})_{permute2}$ is a matrix obtained through third preset column transformation of $G_{N/4}$, 0 is the zero matrix, and I is a unit matrix of N/4×N/4.

Optionally, the first transformation matrix $S_1$ and the second transformation matrix $S_2$ are obtained by using a matrix $P_1$ and a matrix $P_2$, where $S_1 \cdot S_2 = G \cdot P_1 \cdot P_2 \cdot G$, G is the first polar code generation matrix, and the matrix $P_1$ is expressed as:

$$P_1 = \begin{bmatrix} A & 0 \\ 0 & B \end{bmatrix}, \text{ where}$$

$$A = \begin{bmatrix} (G_{N/4})_{permute1} \cdot G_{N/4} & 0 \\ 0 & I \end{bmatrix}, B = \begin{bmatrix} (G_{N/4})_{permute2} \cdot G_{N/4} & 0 \\ 0 & I \end{bmatrix},$$

$G_{N/4}$ is the third polar code generation matrix, N/4 represents that the third polar code generation matrix is N/4×N/4-dimensional, N represents that the first polar code generation matrix is N×N-dimensional, $(G_{N/4})_{permute1}$ is the matrix obtained through the second preset column transformation of $G_{N/4}$, $(G_{N/4})_{permute2}$ is the matrix obtained through the third preset column transformation of $G_{N/4}$, 0 is the zero matrix, and I is a unit matrix; and
   the matrix $P_2$ is expressed as:

$$P_2 = \begin{bmatrix} C & 0 \\ 0 & I \end{bmatrix}, \text{ where}$$

$$C = \begin{bmatrix} (G_{N/4})_{permute1} & 0 \\ G_{N/4} & G_{N/4} \end{bmatrix}_{permute3} \cdot \begin{bmatrix} (G_{N/4})_{permute1} & 0 \\ G_{N/4} & G_{N/4} \end{bmatrix}^{-1}, \text{ and}$$

$$\begin{bmatrix} (G_{N/4})_{permute1} & 0 \\ G_{N/4} & G_{N/4} \end{bmatrix}_{permute3}$$

is the matrix obtained through the fourth preset column transformation of $$\begin{bmatrix} (G_{N/4})_{permute1} & 0 \\ G_{N/4} & G_{N/4} \end{bmatrix}.$$

Optionally, the target matrix is T·G, where G is the first polar code generation matrix, T is the transformation matrix and is an upper triangular matrix, the first matrix is $(T \cdot G)_{AA}$, and the second matrix is $(T \cdot G)_{AA}{}^C$, where A represent the information bit, and $A^C$ represents the frozen bit.

It should be understood that the encoding apparatus 1400 herein is embodied in a form of a functional unit. The term "unit" herein may refer to an application-specific integrated circuit (ASIC), an electronic circuit, a processor (for example, a shared processor, a dedicated processor, or a group processor) configured to execute one or more software or firmware programs, a memory, a merged logic circuit, and/or another appropriate component that supports the described function. In an optional example, a person skilled in the art may understand that the encoding apparatus 1400 may specifically be the sending device in the foregoing method embodiment, or a function of the sending device in the foregoing method embodiment may be integrated into the encoding apparatus 1400, and the encoding apparatus 1400 may be configured to perform procedures and/or steps corresponding to the sending device in the foregoing method embodiment.

The encoding apparatus 1400 has a function for implementing the corresponding steps performed by the sending device in the foregoing method embodiment. The function may be implemented by hardware, or may be implemented by hardware executing corresponding software. The hardware or the software includes one or more modules corresponding to the function.

In this embodiment of this application, the encoding apparatus 1400 in FIG. 14 may alternatively be a chip or a chip system, for example, a system on chip (SoC).

Figure 15:
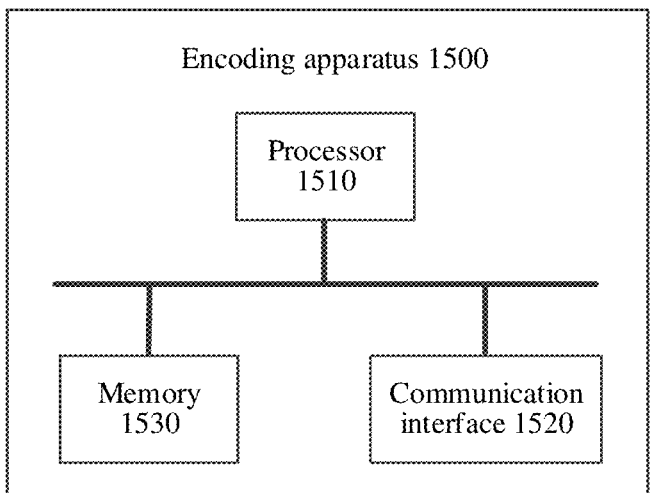
FIG. 15 is another schematic block diagram of an example encoding apparatus based on a systematic polar code according to an embodiment of this application.

FIG. 15 is another schematic block diagram of an example encoding apparatus 1500 based on a systematic polar code according to an embodiment of this application. The encoding apparatus 1500 includes a processor 1510, a communication interface 1520, and a memory 1530. The processor 1510, the communication interface 1520, and the memory 1530 communicate with each other through an internal connection path. The memory 1530 is configured to store instructions. The processor 1510 is configured to execute the instructions stored in the memory 1530, to control the communication interface 1520 to send a signal and/or receive a signal.

It should be understood that the encoding apparatus 1500 may specifically be the sending device in the foregoing method embodiment, or a function of the sending device in the foregoing method embodiment may be integrated into the encoding apparatus 1500, and the encoding apparatus 1500 may be configured to perform steps and/or procedures corresponding to the sending device in the foregoing method embodiment. Optionally, the memory 1530 may include a read-only memory and a random access memory, and provide the instructions and data for the processor. A part of the memory may further include a non-volatile random access memory. For example, the memory may further store information about a device type. The processor 1510 may be configured to execute the instructions stored in the memory, and when the processor executes the instructions, the processor can perform steps and/or procedures corresponding to the sending device in the foregoing method embodiments.

It should be understood that, in embodiments of this application, the processor 1510 may be a central processing unit (CPU). Alternatively, the processor may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

In an implementation process, steps in the foregoing method may be implemented by using a hardware integrated logical circuit in the processor, or by using instructions in a form of software. The steps of the method disclosed with reference to embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory, and a processor reads instructions in the memory and completes the steps in the foregoing methods in combination with hardware of the processor.

An embodiment of this application further provides a computer-readable storage medium. The computer-readable storage medium is configured to store a computer program, and the computer program is for implementing the method corresponding to the sending device in the foregoing embodiment.

An embodiment of this application further provides a chip system. The chip system is configured to support the sending device in the foregoing method embodiment in implementing the functions shown in embodiments of this application.

An embodiment of this application provides a computer program product. The computer program product includes a computer program (which may also be referred to as code or instructions). When the computer program runs on a computer, the computer may perform the method corresponding to the sending device in the foregoing embodiment.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, function units in embodiments of this application may be integrated into one processing unit, each of the units may exist alone physically, or two or more units are integrated into one unit.

When functions are implemented in the form of a software functional unit and sold or used as an independent product, the functions may be stored in a computer-readable storage medium. Based on such an understanding, the technical solutions of this application essentially, or a part contributing to the conventional technology, or a part of the technical solutions may be implemented in a form of a software product. The software product is stored in a storage medium, and includes several instructions for indicating a computer device (which may be a personal computer, a server, or an apparatus) to perform all or a part of the steps of the method described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely non-limiting examples of specific implementations and are not intended to limit the protection scope, which is intended to cover any variation or replacement readily determined by a person of ordinary skill in the art. Therefore, the claims shall define the protection scope.

What is claimed is:

1. An encoding method based on a systematic polar code, comprising:

obtaining, by at least one processor of an encoding apparatus, an input information bit sequence corresponding to information bits;

computing, by the at least one processor a target matrix by multiplying a first polar code generation matrix by a transformation matrix, the transformation matrix being configured to perform sub-block column transformation of the first polar code generation matrix;

forming, by the at least one processor, a first matrix as a sub-matrix of the target matrix consisting of rows corresponding to the information bits and columns corresponding to the information bits;

computing, by the at least one processor, an inverse of the first matrix and multiplying an inverse matrix of the first matrix by the input information bit sequence, to obtain a first bit sequence;

forming, by the at least one processor, a second matrix by selecting, from the target matrix, (i) the rows corresponding to the information bits and (ii) columns corresponding to frozen bits;

encoding, by the at least one processor, the first bit sequence by multiplying the first bit sequence with the second matrix, to obtain a second bit sequence; and outputting, by the at least one processor, the second bit sequence as an encoded codeword for transmission over a communication channel.

2. The method according to claim 1, wherein the target matrix is P·G, where G is the first polar code generation matrix, P is the transformation matrix, the first matrix is $(P·G)_{AA}$, and the second matrix is $(P·G)_{AA^C}$, where A represents the information bits, and $A^C$ represents the frozen bits.

3. The method according to claim 2, wherein the transformation matrix P is expressed as:

$$P = \begin{bmatrix} (G_{N/2})_{permute} \cdot G_{N/2} & 0 \\ 0 & I \end{bmatrix},$$

where $G_{N/2}$ is a second polar code generation matrix, N/2 represents that the second polar code generation matrix is N/2×N/2-dimensional, N represents that the first polar code generation matrix is N×N-dimensional, $(G_{N/2})_{premute}$ is a matrix obtained through first preset column transformation of $G_{N/2}$, 0 is a zero matrix of N/2×N/2, and I is a unit matrix of N/2×N/2.

4. The method according to claim 2, wherein the transformation matrix P is obtained by using a matrix S, P=G·S·G, G is the first polar code generation matrix, and the matrix S is expressed as:

$$S = \begin{bmatrix} G_{N/2} \cdot (G_{N/2})_{permute} & 0 \\ I - G_{N/2} \cdot (G_{N/2})_{permute} & I \end{bmatrix},$$

where $G_{N/2}$ is a second polar code generation matrix, N/2 represents that the second polar code generation matrix is N/2×N/2-dimensional, N represents that the first polar code generation matrix is N×N-dimensional, $(G_{N/2})_{permute}$ is a matrix obtained through first preset column transformation of $G_{N/2}$, 0 is a zero matrix of N/2×N/2, and I is a unit matrix of N/2×N/2.

5. The method according to claim 1, wherein the target matrix is G·S, where G is the first polar code generation matrix, S is the transformation matrix, the first matrix is $(G·S)_{AA}$, and the second matrix is $(G·S)_{AA^C}$, where A represents the information bits, and $A^C$ represents the frozen bits.

6. The method according to claim 5, wherein the transformation matrix S is expressed as:

$$S = \begin{bmatrix} G_{N/2} \cdot (G_{N/2})_{permute} & 0 \\ I - G_{N/2} \cdot (G_{N/2})_{permute} & I \end{bmatrix},$$

where $G_{N/2}$ is a second polar code generation matrix, N/2 represents that the second polar code generation matrix is N/2×N/2-dimensional, N represents that the first polar code generation matrix is N×N-dimensional, $(G_{N/2})_{premute}$ is a matrix obtained through first preset column transformation of $G_{N/2}$, 0 is a zero matrix of N/2×N/2, and I is a unit matrix of N/2×N/2.

7. The method according to claim 5, wherein the transformation matrix S is obtained by using a matrix P, S=G·P·G, G is the first polar code generation matrix, and the matrix P is expressed as:

$$P = \begin{bmatrix} (G_{N/2})_{premute} \cdot G_{N/2} & 0 \\ 0 & I \end{bmatrix},$$

where

G$_{N/2}$ is a second polar code generation matrix, N/2 represents that the second polar code generation matrix is N/2×N/2-dimensional, N represents that the first polar code generation matrix is N×N-dimensional, $(G_{N/2})_{permute}$ is a matrix obtained through first preset column transformation of $G_{N/2}$, 0 is a zero matrix of N/2×N/2, and I is a unit matrix of N/2×N/2.

8. The method according to claim 1, wherein the transformation matrix comprises a first transformation matrix and a second transformation matrix.

9. The method according to claim 8, wherein the target matrix is $P_2 \cdot P_1 \cdot G$, where G is the first polar code generation matrix, $P_1$ is the first transformation matrix, $P_2$ is the second transformation matrix, the first matrix is $(P_2 \cdot P_1 \cdot G)_{AA}$, and the second matrix is $(P_2 \cdot P_1 \cdot G)_{AA}c$, where A represents the information bits, and $A^c$ represents the frozen bits.

10. The method according to claim 9, wherein the first transformation matrix $P_1$ is expressed as:

$$P_1 = \begin{bmatrix} A & 0 \\ 0 & B \end{bmatrix}, \text{ where}$$

$$A = \begin{bmatrix} (G_{N/4})_{permute1} \cdot G_{N/4} & 0 \\ 0 & I \end{bmatrix}, B = \begin{bmatrix} (G_{N/4})_{permute2} \cdot G_{N/4} & 0 \\ 0 & I \end{bmatrix},$$

G$_{N/4}$ is a third polar code generation matrix, N/4 represents that the third polar code generation matrix is N/4×N/4-dimensional, N represents that a first systematic polar code generation matrix is N×N-dimensional, $(G_{N/4})_{premute1}$ is a matrix obtained through second preset column transformation of $G_{N/4}$, 0 is a zero matrix, I is a unit matrix of N/4×N/4, and $(G_{N/4})_{premute2}$ is a matrix obtained through third preset column transformation of $G_{N/4}$.

11. The method according to claim 10, wherein the second transformation matrix $P_2$ is expressed as:

$$P_2 = \begin{bmatrix} C & 0 \\ 0 & I \end{bmatrix}, \text{ where}$$

$$C = \begin{bmatrix} (G_{N/4})_{permute1} & 0 \\ G_{N/4} & G_{N/4} \end{bmatrix}_{permute3} \cdot \begin{bmatrix} (G_{N/4})_{permute1} & 0 \\ G_{N/4} & G_{N/4} \end{bmatrix}^{-1},$$

$$\begin{bmatrix} (G_{N/4})_{permute1} & 0 \\ G_{N/4} & G_{N/4} \end{bmatrix}_{permute3}$$

is a matrix obtained through fourth preset column transformation of $$\begin{bmatrix} (G_{N/4})_{permute1} & 0 \\ G_{N/4} & G_{N/4} \end{bmatrix},$$

G$_{N/4}$ is the third polar code generation matrix, N/4 represents that the third polar code generation matrix is N/4×N/4-dimensional, N represents that the first polar code generation matrix is N×N-dimensional, 0 is the zero matrix, and I is a unit matrix of N/2×N/2.

12. The method according to claim 11, wherein the first transformation matrix $P_1$ and the second transformation matrix $P_2$ are obtained by using a matrix $S_1$ and a matrix $S_2$, $P_1 \cdot P_2 = G \cdot S_1 \cdot S_2 \cdot G$, G is the first polar code generation matrix, and the matrix $S_1$ is expressed as:

$$S_1 = \begin{bmatrix} D & 0 \\ I-D & I \end{bmatrix}, \text{ where}$$

$$D = \begin{bmatrix} (G_{N/4})_{permute1} & 0 \\ G_{N/4} & G_{N/4} \end{bmatrix}^{-1} \cdot \begin{bmatrix} (G_{N/4})_{permute1} & 0 \\ G_{N/4} & G_{N/4} \end{bmatrix}_{permute3},$$

G$_{N/4}$ is the third polar code generation matrix, N/4 represents that the third polar code generation matrix is N/4×N/4-dimensional, N represents that the first polar code generation matrix is N×N-dimensional, $(G_{N/4})_{premute1}$ is the matrix obtained through the second preset column transformation of $G_{N/4}$, $$\begin{bmatrix} (G_{N/4})_{permute1} & 0 \\ G_{N/4} & G_{N/4} \end{bmatrix}_{permute3}$$

is the matrix obtained through the fourth preset column transformation of $$\begin{bmatrix} (G_{N/4})_{permute1} & 0 \\ G_{N/4} & G_{N/4} \end{bmatrix},$$

0 is the zero matrix, and I is a unit matrix; and the matrix $S_2$ is expressed as:

$$S_2 = \begin{bmatrix} J & 0 \\ K & M \end{bmatrix}, \text{ where } J = \begin{bmatrix} G_{N/4} \cdot (G_{N/4})_{permute1} & 0 \\ I - G_{N/4} \cdot (G_{N/4})_{permute1} & I \end{bmatrix},$$

$$K = \begin{bmatrix} G_{N/4} \cdot (G_{N/4})_{permute2} - G_{N/4} \cdot (G_{N/4})_{permute1} & 0 \\ G_{N/4} \cdot (G_{N/4})_{permute1} - G_{N/4} \cdot (G_{N/4})_{permute2} & 0 \end{bmatrix},$$

$$M = \begin{bmatrix} G_{N/4} \cdot (G_{N/4})_{permute2} & 0 \\ I - G_{N/4} \cdot (G_{N/4})_{permute2} & I \end{bmatrix},$$

and $(G_{N/4})_{permute2}$ is the matrix obtained through the third preset column transformation of $G_{N/4}$.

13. The method according to claim 8, wherein the target matrix is $G \cdot S_2 \cdot S_1$, where G is the first polar code generation matrix, $S_1$ is the first transformation matrix, $S_2$ is the second transformation matrix, the first matrix is $(G \cdot S_2 \cdot S_1)_{AA}$, and the second matrix is $(G \cdot S_2 \cdot S_1)_{AA}c$, where A represents the information bits, and $A^C$ represents the frozen bits.

14. The method according to claim 13, wherein the first transformation matrix $S_1$ is expressed as:

$$S_1 = \begin{bmatrix} D & 0 \\ I-D & I \end{bmatrix}, \text{ where}$$

$$D = \begin{bmatrix} (G_{N/4})_{permute1} & 0 \\ G_{N/4} & G_{N/4} \end{bmatrix}^{-1} \cdot \begin{bmatrix} (G_{N/4})_{permute1} & 0 \\ G_{N/4} & G_{N/4} \end{bmatrix}_{permute3},$$

G$_{N/4}$ is a third polar code generation matrix, N/4 represents that the third polar code generation matrix is N/4×N/4-dimensional, N represents that the first polar code generation matrix is N×N-dimensional, $(G_{N/4})_{premute1}$ is a matrix obtained through second preset column transformation of $G_{N/4}$, $$\begin{bmatrix} (G_{N/4})_{permute1} & 0 \\ G_{N/4} & G_{N/4} \end{bmatrix}_{permute3}$$

is a matrix obtained through fourth preset column transformation of $$\begin{bmatrix} (G_{N/4})_{permute1} & 0 \\ G_{N/4} & G_{N/4} \end{bmatrix},$$

0 is a zero matrix, and I is a unit matrix of N/2×N/2.

15. The method according to claim 14, wherein the second transformation matrix $S_2$ is expressed as:

$$S_2 = \begin{bmatrix} J & 0 \\ K & M \end{bmatrix}, \text{where } J = \begin{bmatrix} G_{N/4} \cdot (G_{N/4})_{permute1} & 0 \\ I - G_{N/4} \cdot (G_{N/4})_{permute1} & I \end{bmatrix},$$

$$K = \begin{bmatrix} G_{N/4} \cdot (G_{N/4})_{permute2} - G_{N/4} \cdot (G_{N/4})_{permute1} & 0 \\ G_{N/4} \cdot (G_{N/4})_{permute1} - G_{N/4} \cdot (G_{N/4})_{permute2} & 0 \end{bmatrix},$$

$$M = \begin{bmatrix} G_{N/4} \cdot (G_{N/4})_{permute2} & 0 \\ I - G_{N/4} \cdot (G_{N/4})_{permute2} & I \end{bmatrix},$$

$G_{N/4}$ is the third polar code generation matrix, N/4 represents that a third systematic polar code generation matrix is N/4×N/4-dimensional, N represents that the first polar code generation matrix is N×N-dimensional, $(G_{N/4})_{permute1}$ is the matrix obtained through the second preset column transformation of $G_{N/4}$, $(G_{N/4})_{permute2}$ is a matrix obtained through third preset column transformation of $G_{N/4}$, 0 is the zero matrix, and I is a unit matrix of N/4×N/4.

16. The method according to claim 11, wherein the first transformation matrix $S_1$ and the second transformation matrix $S_2$ are obtained by using a matrix $P_1$ and a matrix $P_2$, $S_1 \cdot S_2 = G \cdot P_1 \cdot P_2 \cdot G$, where G is the first polar code generation matrix, and the matrix $P_1$ is expressed as:

$$P_1 = \begin{bmatrix} A & 0 \\ 0 & B \end{bmatrix}, \text{where}$$

$$A = \begin{bmatrix} (G_{N/4})_{permute1} \cdot G_{N/4} & 0 \\ 0 & I \end{bmatrix}, B = \begin{bmatrix} (G_{N/4})_{permute2} \cdot G_{N/4} & 0 \\ 0 & I \end{bmatrix},$$

$G_{N/4}$ is the third polar code generation matrix, N/4 represents that the third polar code generation matrix is N/4×N/4-dimensional, N represents that the first polar code generation matrix is N×N-dimensional, $(G_{N/4})_{permute1}$ is the matrix obtained through the second preset column transformation of $G_{N/4}$, $(G_{N/4})_{permute2}$ is the matrix obtained through the third preset column transformation of $G_{N/4}$, 0 is the zero matrix, and I is a unit matrix; and the matrix $P_2$ is expressed as:

$$P_2 = \begin{bmatrix} C & 0 \\ 0 & I \end{bmatrix}, \text{where}$$

-continued
$$C = \begin{bmatrix} (G_{N/4})_{permute1} & 0 \\ G_{N/4} & G_{N/4} \end{bmatrix}_{permute3} \cdot \begin{bmatrix} (G_{N/4})_{permute1} & 0 \\ G_{N/4} & G_{N/4} \end{bmatrix}^{-1}, \text{and}$$

$$\begin{bmatrix} (G_{N/4})_{permute1} & 0 \\ G_{N/4} & G_{N/4} \end{bmatrix}_{permute3}$$

is the matrix obtained through the fourth preset column transformation of $$\begin{bmatrix} (G_{N/4})_{permute1} & 0 \\ G_{N/4} & G_{N/4} \end{bmatrix}.$$

17. The method according to claim 1, wherein the target matrix is T·G, where G is the first polar code generation matrix, T is the transformation matrix and is an upper triangular matrix, the first matrix is $(T \cdot G)_{AA}$, and the second matrix is $(T \cdot G)_{AA^C}$, where A represents the information bits, and $A^C$ represents the frozen bits.

18. An encoding apparatus based on a systematic polar code, comprising at least one processor and a memory storing instructions that, when executed by the at least one processor, cause the encoding apparatus to perform operations comprising:

obtaining an input information bit sequence corresponding to information bits;

computing a target matrix by multiplying a first polar code generation matrix by a transformation matrix, the transformation matrix being configured to perform sub-block column transformation of the first polar code generation matrix; and forming a first matrix as a sub-matrix of the target matrix consisting of rows corresponding to the information bits and columns corresponding to the information bits;

computing an inverse of the first matrix and multiplying an inverse matrix of the first matrix by the input information bit sequence, to obtain a first bit sequence;

forming a second matrix by selecting, from the target matrix, (i) the rows corresponding to the information bits and (ii) columns corresponding to frozen bits; and encoding the first bit sequence by multiplying the first bit sequence with the second matrix, to obtain a second bit sequence.

19. The encoding apparatus according to claim 18, wherein the target matrix is P·G, where G is the first polar code generation matrix, P is the transformation matrix, the first matrix is $(P \cdot G)_{AA}$, and the second matrix is $(P \cdot G)_{AA^C}$, where A represents the information bits, and $A^C$ represents the frozen bits.

20. The encoding apparatus according to claim 18, wherein the target matrix is G·S, where G is the first polar code generation matrix, S is the transformation matrix, the first matrix is $(G \cdot S)_{AA}$, and the second matrix is $(G \cdot S)_{AA^C}$, where A represents the information bits, and $A^C$ represents the frozen bits.

\* \* \* \* \*